(12) United States Patent
Lee et al.

(10) Patent No.: US 12,524,194 B2
(45) Date of Patent: Jan. 13, 2026

(54) ELECTRONIC DEVICE AND METHOD FOR OPERATING AUDIO BASED ON PRIVACY

(71) Applicant: Samsung Electronics Co., Ltd., Gyeonggi-do (KR)

(72) Inventors: Areum Lee, Gyeonggi-do (KR); Misun Kim, Gyeonggi-do (KR); Sangheon Kim, Gyeonggi-do (KR); Mira Seo, Gyeonggi-do (KR); Kwangyong Choi, Gyeonggi-do (KR); Hyesoon Jeong, Gyeonggi-do (KR); Yeunwook Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 770 days.

(21) Appl. No.: 17/874,841

(22) Filed: Jul. 27, 2022

(65) Prior Publication Data

US 2022/0374199 A1 Nov. 24, 2022

Related U.S. Application Data

(63) Continuation of application No. PCT/KR2022/007358, filed on May 24, 2022.

(30) Foreign Application Priority Data

May 24, 2021 (KR) .......................... 10-2021-0066300

(51) Int. Cl.
*G06F 3/16* (2006.01)
*G06F 40/279* (2020.01)
(Continued)

(52) U.S. Cl.
CPC ............ *G06F 3/165* (2013.01); *G06F 40/279* (2020.01); *G06V 40/166* (2022.01);
(Continued)

(58) Field of Classification Search
CPC ..... G06F 3/165; G06F 40/279; G06V 40/166; G06V 40/168; B60R 16/037;
(Continued)

(56) References Cited

U.S. PATENT DOCUMENTS 8,621,645 B1 12/2013 Spackman
10,569,652 B2 2/2020 Akachi et al.
(Continued)

FOREIGN PATENT DOCUMENTS

CN 110489949 11/2019
JP 2004-213175 7/2004
(Continued)

OTHER PUBLICATIONS

International Search Report dated Aug. 25, 2022 issued in counterpart application No. PCT/KR2022/007358, 10 pages.

*Primary Examiner* — Rasha S Al Aubaidi
(74) *Attorney, Agent, or Firm* — The Farrell Law Firm, P.C.

(57) ABSTRACT

Disclosed is an electronic device which includes at least one camera module, at least one microphone, a communication module, a memory, and a processor operatively connected to the at least one camera module, the at least one microphone, the communication module, or the memory, the processor being configured to detect whether a user has taken a vehicle based on detection of the vehicle through the communication module, determine an existence or nonexistence of a passenger in the vehicle based on at least one of an external electronic device searched for through the communication module, a sound collected by the at least one microphone, or an image obtained from the at least one camera module, identify relationship information on the passenger, analyze an attribute of audio of which an output has been requested, (Continued)

and control an audio output through the vehicle based on the relationship information and the attribute of the audio.

9 Claims, 15 Drawing Sheets

(51) Int. Cl.
*G06V 40/16* (2022.01)
*G10L 17/06* (2013.01)
*G10L 25/78* (2013.01)
*H04R 1/08* (2006.01)
*H04R 3/00* (2006.01)

(52) U.S. Cl.
CPC ............ *G06V 40/168* (2022.01); *G10L 17/06* (2013.01); *G10L 25/78* (2013.01); *H04R 1/08* (2013.01); *H04R 3/00* (2013.01); *H04R 2499/13* (2013.01)

(58) Field of Classification Search
CPC ...... B60R 16/023; B60W 40/08; G10L 13/08; G10L 25/78; G10L 17/06; G10L 15/02; H04N 7/18; H04N 5/225; H04R 1/08; H04R 1/10; H04R 3/00
See application file for complete search history.

(56) References Cited

U.S. PATENT DOCUMENTS

| | | |
|---|---|---|
| 10,926,637 B2 | 2/2021 | Ikeda et al. |
| 11,169,860 B2 | 11/2021 | Lee |
| 2011/0061089 A1 | 3/2011 | O'Sullivan et al. |
| 2016/0057574 A1 | 2/2016 | Park |
| 2021/0174790 A1 | 6/2021 | Nishiyama et al. |

FOREIGN PATENT DOCUMENTS

| | | |
|---|---|---|
| JP | 2016-143299 | 8/2016 |
| KR | 10-2012-0079972 | 7/2012 |
| KR | 1020160024295 | 3/2016 |
| KR | 1020170025094 | 3/2017 |
| KR | 10-2020-0074168 | 6/2020 |
| KR | 1020200142314 | 12/2020 |
| KR | 1020210052673 | 5/2021 |
| WO | WO 2014/049719 | 4/2014 |

[510]

ELECTRONIC DEVICE AND METHOD FOR OPERATING AUDIO BASED ON PRIVACY

CROSS-REFERENCE TO RELATED APPLICATION(S)

This application is a Bypass Continuation Application of PCT International Application No. PCT/KR/2022/007358, which was filed on May 24, 2022, in the Korean Intellectual Property Office, and claims priority to Korean Patent Application No. 10-2021-0066300, which was filed on May 24, 2021, in the Korean Intellectual Property Office, the content of each of which is incorporated herein by reference.

BACKGROUND

1. Field

The disclosure relates generally to an electronic device and a method for operating audio based on privacy.

2. Description of Related Art

With the development of digital technology, various types of electronic devices, such as a mobile communication terminal, a personal digital assistant (PDA), an electronic notebook, a smart phone, a tablet personal computer (PC), and a wearable device, are widely used. In order to support functions and to increase the use of such electronic devices, hardware parts and/or software parts of the electronic devices are continuously improved.

For example, an electronic device stores various kinds of personal information (e.g., an account number, a card number, or a password), and a security technology for preventing personal information stored in the electronic device from leaking due to a loss of the electronic device or hacking may be applied to the electronic device. Further, the electronic device provides various useful functions through analysis of a user's usage pattern. During the analysis of the usage pattern, unwanted exposure of personal information (e.g., location information) may occur.

An electronic device may analyze a user's usage pattern, and may execute a configured function in accordance with a user's state (e.g., driving or sleeping) or location (e.g., a home location or an office location). For example, while a user is driving, an electronic device may provide a text-to-speech (TTS) function for rendering speech of a message being received from a message (or messenger) application. If the TTS function is provided when the user is with another person in the vehicle and the message contents are intended to be private, then the message contents may accidentally be revealed to the another person in the vehicle.

SUMMARY

The present disclosure has been made to address the above-mentioned problems and disadvantages, and to provide at least the advantages described below.

According to an aspect of the disclosure, an electronic device includes at least one camera module, at least one microphone, a communication module, a memory, and a processor operatively connected to the at least one camera module, the at least one microphone, the communication module, or the memory, the processor being configured to detect whether a user has taken a vehicle based on detection of the vehicle through the communication module, determine an existence or nonexistence of a passenger in the vehicle based on at least one of an external electronic device searched for through the communication module, a sound collected by the at least one microphone, or an image obtained from the at least one camera module, identify relationship information on the passenger, analyze an attribute of audio of which an output has been requested, and control an audio output through the vehicle based on the relationship information and the attribute of the audio.

According to another aspect of the disclosure, a method for operating an electronic device includes detecting whether a user has taken a vehicle based on detection of the vehicle through a communication module of the electronic device, determining an existence or nonexistence of a passenger in the vehicle based on at least one of an external electronic device searched for through the communication module, a sound collected by at least one microphone of the electronic device, or an image obtained from at least one camera module of the electronic device, giving a protection level based on the relationship information on the passenger, giving a weight value based on an attribute of audio of which an output has been requested, and controlling an audio output through the vehicle based on the protection level in accordance with the relationship information and the weight value in accordance with the attribute of the audio.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
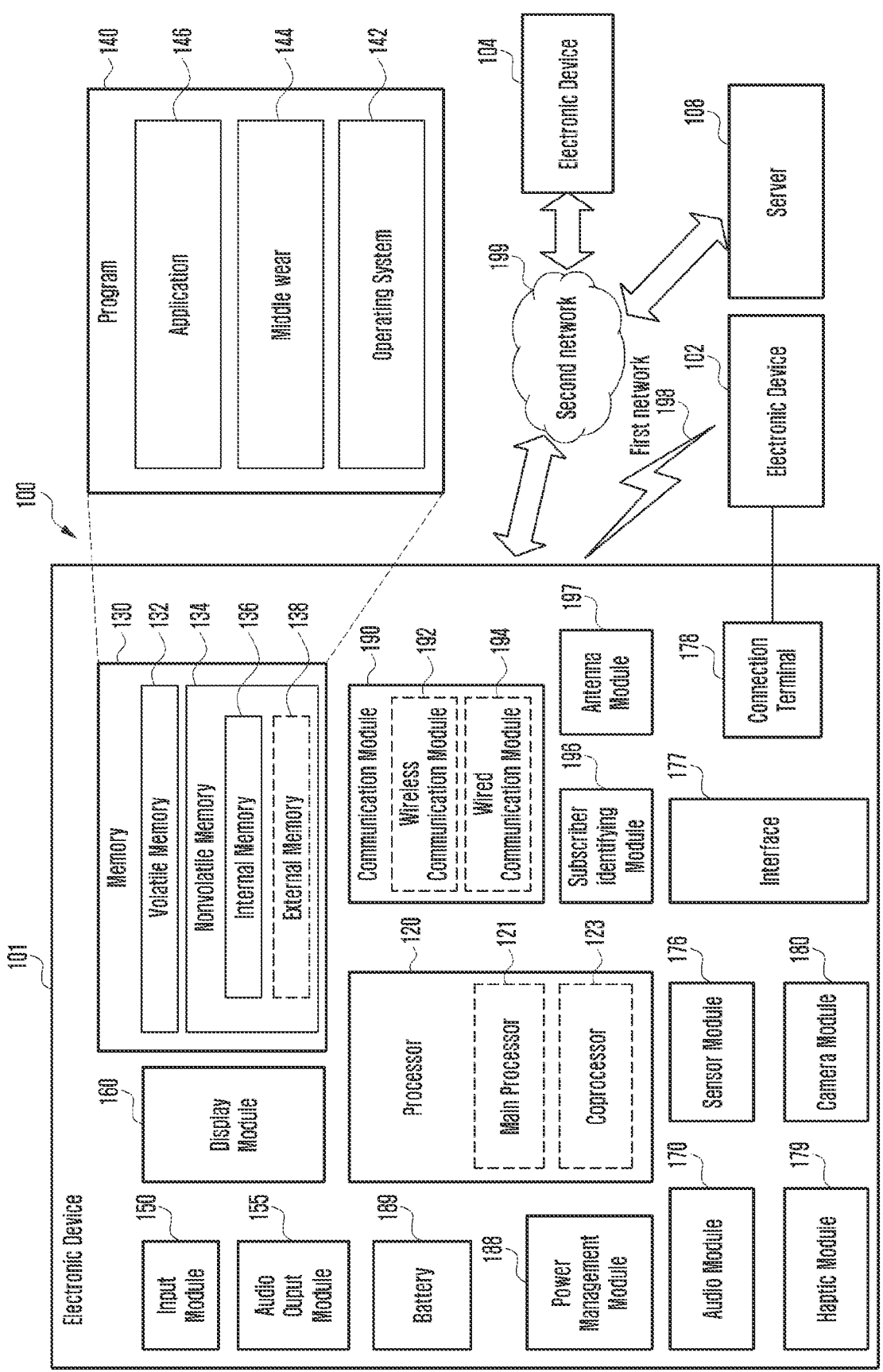
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Various embodiments disclose a method and an apparatus for detecting a user's vehicle being taken, determining existence/nonexistence of any passenger in the vehicle, identifying relationship information on the passenger, analyzing an attribute of an audio of which an output has been requested, and controlling an audio output through the vehicle based on the relationship information and the audio attribute.

According to various embodiments, if it is determined that another person has taken the vehicle together with the user, audio may not be output in the vehicle in accordance with the attribute of the audio of which the output has been requested, and thus unwanted audio can be prevented from being output.

According to various embodiments, audio may be output into the vehicle in accordance with the attribute of the audio of which the output has been requested, or the audio may be output to another audio output device (e.g., a user's wireless audio output device).

According to various embodiments, if it is determined that another person has taken the vehicle together with the user, audio may not be output through the vehicle with respect to a phone or text notification related to personal privacy, and thus personal information security can be enhanced.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134.

According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include a microphone, a mouse, a keyboard, a key (e.g., a button), or a digital pen (e.g., a stylus pen).

The sound output module 155 may output sound signals to the outside of the electronic device 101. The sound output module 155 may include a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., a state of power or temperature) of the electronic device 101 or an environmental state (e.g., a state of a user) external to the electronic device 101, and then generate an electrical signal or data value corresponding to the detected state. According to an embodiment, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of a power management integrated circuit (PMIC).

The battery 189 may supply power to at least one component of the electronic device 101. According to an embodiment, the battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR Data Association (IrDA)) or the second network 199 (e.g., a long-range communication network, such as a legacy cellular network, a 5th generation (5G) network, a next-generation communication network, the Internet, or a computer network (e.g., an LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor 120 of the electronic device 101 (e.g., a machine) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to certain embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Additionally or alternatively, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
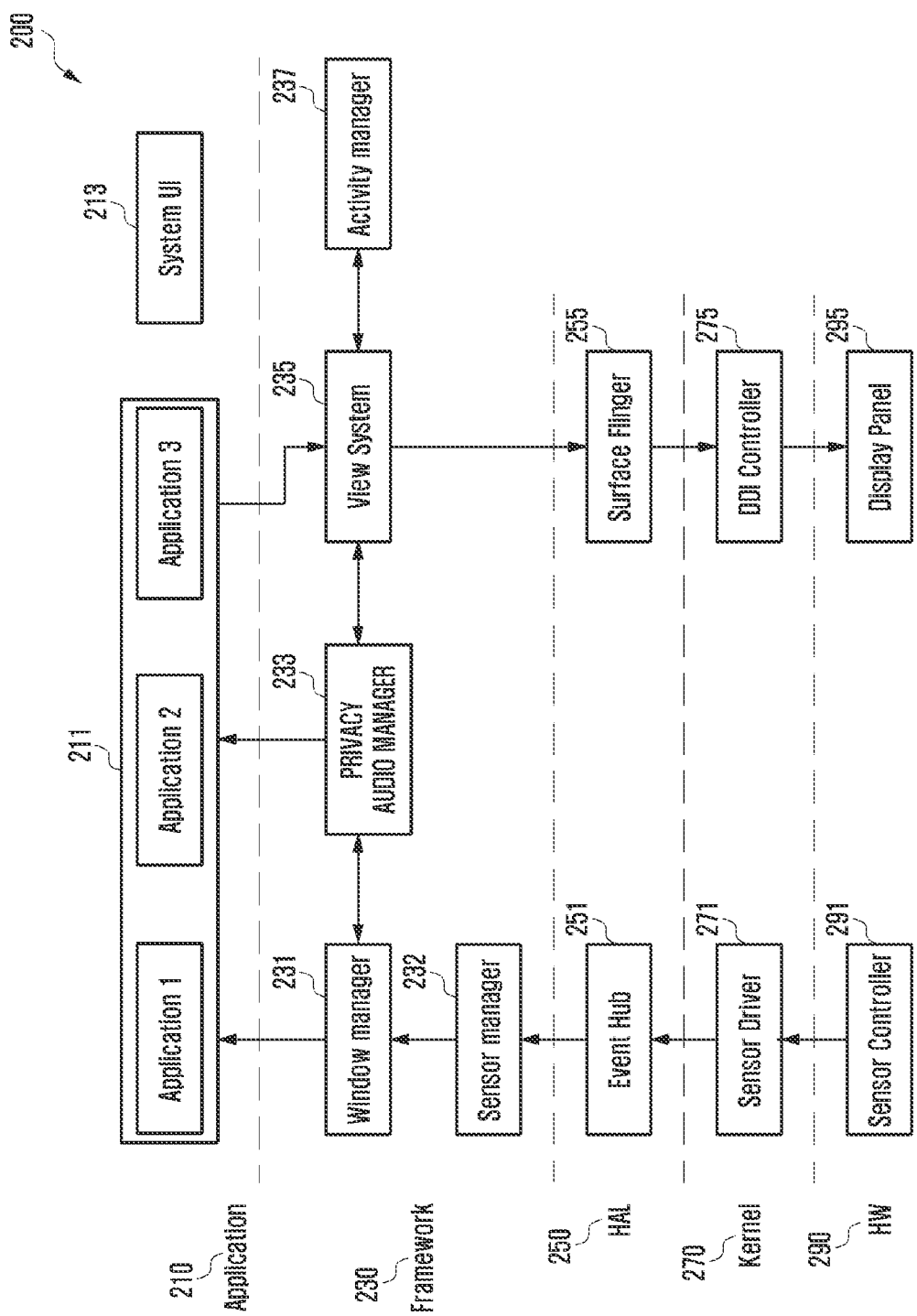
FIG. 2 is a block diagram of a program module of an electronic device, according to an embodiment.

FIG. 2 is a block diagram exemplifying a program module of an electronic device, according to an embodiment.

With reference to FIG. 2, an electronic device 101 includes an OS 142 controlling resources related to the electronic device 101 and/or a program module 200 including various applications being driven in the OS. The OS 142 may be an OS, such as Android™, iOS™, Windows™, Symbian™, Tizen™, or Bada™. FIG. 2 may represent the program module 200 supporting a privacy-based audio operation in the electronic device 101 of the Android™ OS.

The program module 200 may include an application 210, a framework 230, a hardware abstraction layer (HAL) 250, a kernel 270, or hardware (HW) 290. At least parts of the program module 200 may be preloaded on the electronic device 101, or can be downloaded from an external electronic device (e.g., electronic devices 102 and 104) or a server 106. The application 210 may include at least one application 211 (e.g., application 1, application 2, and application 3) that can be stored in a memory 130 of the electronic device 101 and can be executed by the processor 120, and a system UI 213. The kind of application 210 is not limited based on the electronic device 101 and/or a system UI 213. The kind of application 210 may incorporate a camera, an internet browser, a video, or a game application. The system UI 213 may mean an application configuring various graphical user interface (GUI) screens being implemented on the system of the electronic device 101, such as a notification bar and quick view.

The framework 230 may provide various functions to the application 210 so that functions or information provided from one or more resources of the electronic device 101 can be used by the application 210. The framework 230 may include a window manager 231, a sensor manager 232, a personal privacy audio manager 233, a view system 235, or an activity manager 237. The window manager 231 may manage one or more GUI resources being used on the screen of the electronic device 101. The window manager 231 may detect the change of the state of the electronic device 101 through the sensor 176, and may transfer information of a display area corresponding to the state of the electronic device 101 to the application 210. If the state change of the electronic device 101 is identified, the window manager 231 may transfer the information of the display area corresponding to the changed state of the electronic device 101 to the application of which continuity is configured among the at least one application 211 being executed. The sensor manager 232 may control the application based on the usability of the application of the sensor 176. The privacy audio manager 233 may detect the user's vehicle being taken, determine existence/nonexistence of the passenger (e.g., via a device search, sound analysis, and image analysis), identify the relationship information on the passenger, analyze the attribute of an audio of which the output has been requested, and control the audio output through the vehicle based on the identified relationship information and the audio attribute. The view system 235 may be a set of expandable views being used to generate a user interface of the application 210. The activity manager 237 may control a lifecycle and an activity stack of the application 210.

The hardware abstraction layer 250 may mean an abstracted layer between a plurality of hardware modules included in the hardware 290 and software of the electronic device 101. The hardware abstraction layer 250 may include an event HUB 251 or a surface flinger 255. The event HUB 251 may provide an interface for standardizing an event generated by the sensor module 176. The surface flinger 255 may provide an execution screen to be displayed on a display device 160 among execution screens generated by the at least one application 211, and may request the application 210 to process the change of resolution and density in accordance with the configuration of the display when the display configuration is changed.

The kernel 270 may include various drivers for controlling various hardware modules included in the electronic device 101. The kernel 270 may include a sensor driver 271 or display driver integrated circuit (DDI) controller 275. The sensor driver 271 may be an interface module controlling a sensor controller 291 connected to the sensor module 176. The DDI controller 275 may be an interface module controlling a DDI.

The hardware 290 may include the sensor controller 291 or a display panel 295. In case that the electronic device 101 is a foldable device, the sensor controller 291 may include a hall sensor for sensing a folding state. The display panel 295 may mean the display device 160.

Figure 3:
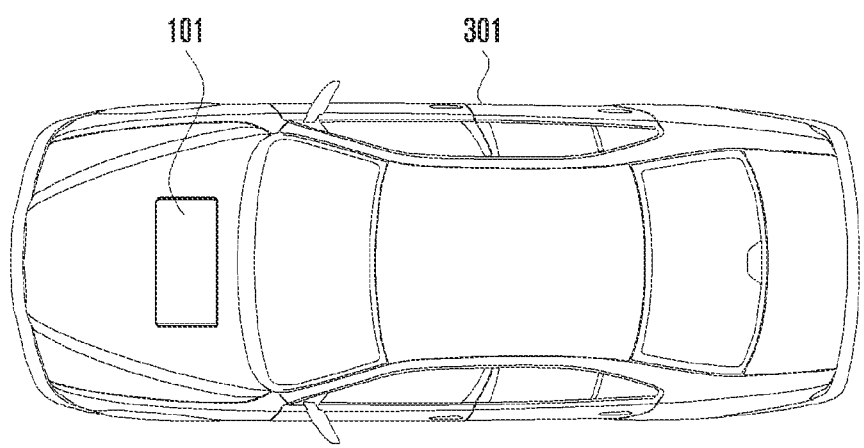
FIG. 3 is a diagram illustrating the relationship between an electronic device and a vehicle, according to an embodiment.

FIG. 3 is a diagram illustrating the relationship between an electronic device and a vehicle, according to an embodiment.

With reference to FIG. 3, if the electronic device 101 approaches a vehicle 301 within a predetermined distance (e.g., a communicable range), the electronic device may be connected to the vehicle 301 using various communication methods (e.g., Bluetooth™, Bluetooth™ low energy (BLE), and ultra-wide band (UWB). The electronic device 101 may include a smart phone, a tablet PC, and/or a notebook PC. For example, the electronic device 101 may recognize a car key, and when approaching the vehicle 301, the electronic device 101 may open the door of the vehicle 301 by controlling the vehicle 301.

The vehicle 301 may include a smart control system including a communication module (e.g., a wireless communication module) for communicating with the electronic device 101, at least one camera 180, or at least one sensor module 176. The vehicle 301 may communicate with a neighboring electronic device, a neighboring vehicle, and a neighboring infra through a short-range communication, such as vehicle to everything (V2X), Bluetooth™ (or BLE), or UWB. Red blue green (RGB) cameras or vision cameras may be provided on front, rear, and side surfaces of the vehicle 301. The vehicle 301 may recognize an object (e.g., an electronic device, human, animal, or thing) adjacent to the vehicle 301 through the sensor module 176, such as an ultrasonic sensor, a lidar sensor, a radar sensor, or a laser sensor.

The electronic device 101 may receive information indicating whether a passenger has taken the vehicle 301 from the vehicle 301. If a weight that is greater than or equal to a predetermined size (e.g., 15 kilograms (kg)) is detected on a seat of the vehicle 301 through the smart control system in the vehicle 301, the vehicle 301 may transmit information indicating that the passenger has taken the vehicle to the electronic device 101. Further, the vehicle 301 may notify the electronic device 101 whether the passenger has taken the vehicle by transmitting an image obtained through the camera mounted inside the vehicle 301 to the electronic device 101, or analyzing the obtained image and transmitting the analysis result to the electronic device 101.

An electronic device (e.g., electronic device 101 of FIG. 1) according to various embodiments of the disclosure may include: at least one camera module (e.g., camera module 180 of FIG. 1); at least one microphone (e.g., input module 150 of FIG. 1); a communication module (e.g., communication module 190 of FIG. 1); a memory (e.g., memory 130 of FIG. 1); and a processor (e.g., processor 120 of FIG. 1) operatively connected to the at least one camera module, the at least one microphone, the communication module, or the memory, wherein the processor is configured to: detect whether a user has taken a vehicle (e.g., vehicle 301 of FIG. 1) based on detection of the vehicle through the communication module, determine existence/nonexistence of a passenger in the vehicle based on at least one of an external electronic device (e.g., electronic device 102 and electronic device 104 of FIG. 1) searched for through the communication module, a sound collected by the at least one microphone, or an image obtained from the at least one camera module, identify relationship information on the passenger, analyze an attribute of audio of which an output has been requested, and control an audio output through the vehicle based on the relationship information and the attribute of the audio.

The processor may be configured to determine that the user has taken the vehicle in case that a connection with the vehicle is attempted through a scanning process or the connection with the vehicle is made with the vehicle based on a configured communication method.

The processor may be configured to determine that a passenger is present in the vehicle in case that an advertisement packet is transmitted through the scanning process, and a response signal for the advertisement packet is received from the external electronic device.

The processor may be configured to collect ambient sound through the at least one microphone, and determine that the passenger is present in the vehicle in case that a non-user voice is detected through analysis of the collected sound.

The processor may be configured to obtain an image from the at least one camera, and determine that the passenger is present in the vehicle in case that a non-user face is detected through analysis of the image.

The processor may be configured to determine whether the passenger is a registered user from at least one of the external electronic device possessed by the passenger, the passenger's voice, or the passenger's image, identify a group to which the passenger belongs or a number of contacts with the passenger in case that the passenger is the registered user, and determine a protection level for the passenger based on the group to which the passenger belongs or the number of contacts with the passenger.

The processor may be configured to give a fourth protection level for the passenger in case that the passenger is not the registered user, give a third protection level for the passenger in case that the group to which the passenger belongs is not a predetermined group, give a second protection level for the passenger in case that a number of contacts with the passenger is less than or equal to a predetermined number, and give a first protection level for the passenger in case that the group to which the passenger belongs is the predetermined group, and the number of contacts with the passenger exceeds the predetermined number.

The processor may be configured to determine whether the attribute of the audio of which the output has been requested is a predetermined audio attribute, determine whether a configured word is included in a text corresponding to the audio in case that the attribute of the audio of which the output has been requested is the predetermined audio attribute, and give a weight value for the audio of which the output has been requested based on whether the configured word is included in the text corresponding to the audio.

The processor may be configured to give a third weight value for the audio of which the output has been requested in case that the attribute of the audio of which the output has been requested is not the predetermined audio attribute, give a second weight value for the audio of which the output has been requested in case that the attribute of the audio of which the output has been requested is the predetermined audio attribute, and the configured word is not included in the text corresponding to the audio, and give a first weight value for the audio of which the output has been requested in case that the attribute of the audio of which the output has been requested is the predetermined audio attribute, and the configured word is included in the text corresponding to the audio.

The processor may be configured to allow an audio output through the vehicle regardless of the relationship information of the passenger in case that the third weight value is given for the audio of which the output has been requested.

The processor may be configured to allow an audio output through the vehicle in case that the first weight value is given for the audio of which the output has been requested, and a protection level in accordance with the relationship information of the passenger is a predetermined protection level, and disallow the audio output through the vehicle in case that the first weight value is given for the audio of which the output has been requested, and the protection level in accordance with the relationship information of the passenger is not the predetermined protection level.

The processor may be configured to determine whether a user device is connected to the electronic device in case that the passenger takes the vehicle, and the first weight value is given for the audio of which the output has been requested, and control the audio of which the output has been requested to be output through the user device in case that the user device is connected to the electronic device.

The processor may be configured to allow or disallow an audio output through the vehicle based on the relationship information and the attribute of the audio, determine whether a user device is connected to the electronic device in case that the audio output through the vehicle is disallowed, and control the audio of which the output has been requested to be output through the user device in case that the user device is connected to the electronic device.

Figure 4:
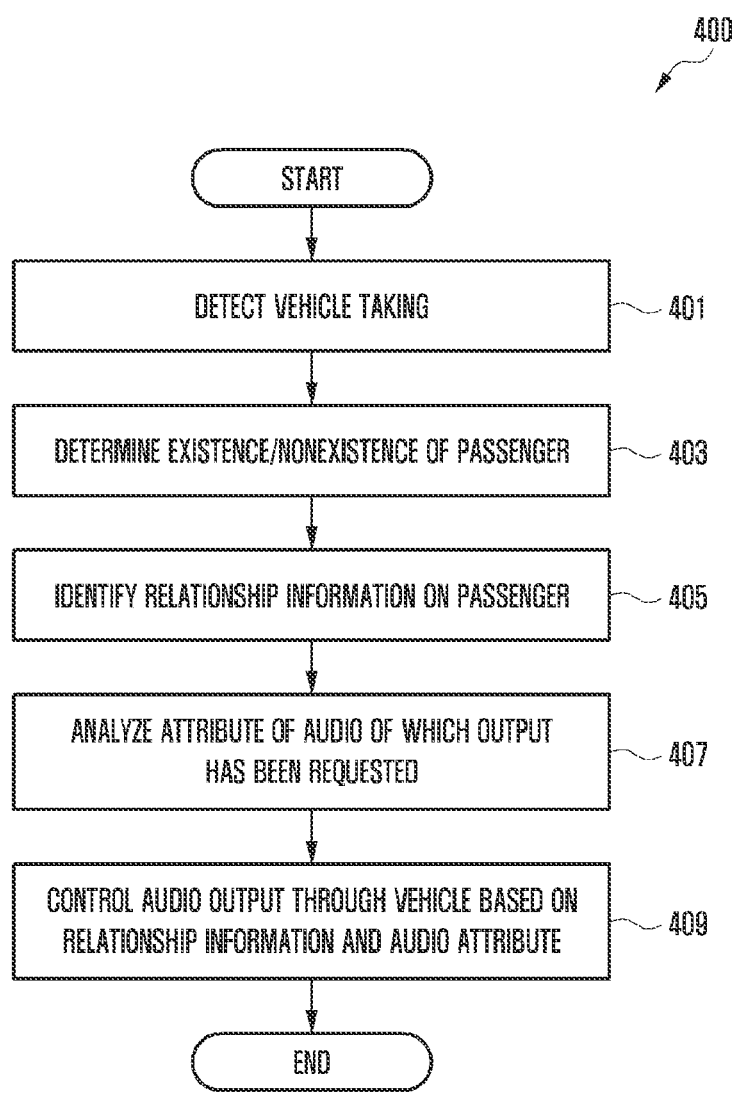
FIG. 4 is a flowchart illustrating an operation method of an electronic device, according to an embodiment.

FIG. 4 is a flowchart 400 illustrating an operation method of an electronic device, according to an embodiment.

With reference to FIG. 4, at step 401, a processor of an electronic device detects whether a user has taken a vehicle. If the electronic device 101 approaches the vehicle 301 within a predetermined distance (e.g., a communicable range), the electronic device may be connected to the vehicle 301 using various communication methods (e.g., Bluetooth™, BLE, and UWB). For example, if power is supplied to the vehicle 301 or if the vehicle starts up, the processor 120 may be connected to the vehicle 301 through the Bluetooth™. If the electronic device 101 attempts the connection to the vehicle 301 through a scanning process (e.g., a BLE advertising operation), or is connected to the vehicle 301 through a configured communication method (e.g., a UWB or Bluetooth™ connection), the processor 120 may determine that the user has taken the vehicle 301. Further, in case of taking the vehicle 301, location information of the vehicle 301 may be stored in a memory, and the processor 120 may determine that the user has approached or has taken the vehicle 301 in case that the location information of the electronic device 101 obtained from a GNSS communication module is indicates the vehicle to be within a predetermined distance (e.g., 1 meter (m) or 30 centimeters (cm)).

At step 403, the processor 120 determines existence/nonexistence of the passenger in the vehicle. If the electronic device 101 is connected to the vehicle 301, the processor 120 may output an audio through an audio output unit in the vehicle 301. If another person has taken the vehicle 301 together with the user (e.g., if the passenger exists in the vehicle) during the audio output, the processor 120 may determine whether to perform the audio output based on the relationship between the user and the other person or an audio attribute to protect the user's personal information. To determine whether to perform the audio output, the processor 120 may determine the existence/nonexistence of the passenger in the vehicle 301 by analyzing the communication connection, sound, or image.

For example, the processor 120 may transmit an advertisement packet (e.g., a BLE advertising packet) (e.g., using a scanning process), and may determine whether an external electronic device (e.g., electronic device 102 or electronic device 104 of FIG. 1) is present around the electronic device 101 depending on whether a response signal to the advertisement packet is received. The processor 120 may collect (or obtain) ambient sound information through at least one microphone (e.g., input module 150 of FIG. 1) for a predetermine time (e.g., 5 seconds (sec) or 10 sec), and may determine whether a non-user voice is detected by analyzing the collected sound. The processor 120 may obtain an image (or preview image) from the camera module 180 by driving the at least one camera, and may determine whether a non-user face is detected by analyzing the obtained image. The processor 120 may determine the existence/nonexistence of the passenger in the vehicle in accordance with the sound analysis or face detection in association with an external server (e.g., server 108 of FIG. 1).

The electronic device 101 may determine the existence/nonexistence of the passenger in the vehicle through reception of information indicating whether the passenger has taken the vehicle 301 from the vehicle 301. If a weight that is greater than or equal to a predetermined size (e.g., 15 kg) is detected on the seat of the vehicle 301 through the smart control system in the vehicle 301, the vehicle 301 may transmit information indicating that the passenger has taken the vehicle to the electronic device 101. Further, the vehicle 301 may notify the electronic device 101 whether the passenger has taken the vehicle by transmitting an image obtained through the camera mounted inside the vehicle 301 to the electronic device 101, or by analyzing the obtained image and transmitting the analysis result to the electronic device 101.

In case that only the user has taken the vehicle 301 without the passenger, the processor 120 may output the audio of which the output has been requested through the audio output unit in the vehicle 301. For example, if a text-to-speech (TTS) function is activated in the electronic device 101, the processor 120 may provide the TTS function with respect to the audio of which the output has been requested. Hereinafter, an operation being performed in case that the passenger is present in the vehicle 301 will be described.

At step 405, the processor 120 identifies relationship information with regards to the passenger. The relationship information may indicate an intimacy level between the user and the passenger. Further, only in case that some passengers (e.g., family) have taken the vehicle 301 together that have a predetermined intimacy level or higher, the audio may be output through the audio output unit in the vehicle 301. If the external electronic device is searched for, the processor 120 may search for the phone number of the external electronic device from a contact, and may identify the relationship information through the group to which the searched phone number belongs. Further, the processor 120 may identify the relationship information by identifying the number of contacts with the passenger through a telephone, a message (or messenger), or a social network service based on the phone number or account of the external electronic device. The processor 120 may determine a protection level based on whether the phone number of the external electronic device belongs to the predetermined group, or whether the number of contacts exceeds a predetermined number of contacts.

The processor 120 may determine the relationship information based on the configured account, a phone number, a text, a call, or a voice. For example, the processor 120 may identify the account based on relationship information using at least one of various kinds of backup data (personal profile information) uploaded to a predetermined account (e.g., a Samsung™ account), phone numbers frequently called by the user, text information, application information frequently used by the user (e.g., a phone application, a messenger application, a social network service (SNS) application), or a UWB relationship based configuration. The personal profile information may include a user's usage information that can be utilized in determining the relationship based information in various fields, such as a demographic field, an interest field, a favorite field, a news field, a product & service behavior field, a keyword field, an age range field, a gender field, a marital status field, and a parental statue field.

The UWB configuration may be divided into "public" and "private" portions, and the public portion can be accessed by everyone, and the private portion can be accessed only by some allowed persons. The processor 120 may be pre-registered with persons having a high intimacy level (also referred to as having a "high intimacy account") through a function of "nearby" from the user to the UWB, and may store the registered persons in the memory 130. Even without the registration, the processor 120 may search for neighboring things through the scanning process, and may receive information on the searched things.

The processor 120 may identify phone number based relationship information by using phone number or e-mail information. The processor 120 may analyze the information (e.g., morpheme) from the contents of the message (or messenger), and analyze the meaning of an ontology based word, or identify text based relationship information by analyzing a meaning of a word (e.g., text related to the intimacy). The processor 120 may identify voice based relationship information based on the voice (e.g., auto record call or interview) stored in the memory 130. The processor 120 may analyze an audio waveform of a voice of a person who frequently performs a call, learn through a recording, and store the voices in the memory 130 with speakers being separated from each other. The processor 120 may obtain the voice from the person who has taken the vehicle 301, and may determine the person who frequently calls as a person who has a high intimacy level or a person having a high relationship level through comparison of the speaker with the speaker stored in the memory 130.

At step 407, the processor 120 identifies the attribute (or attribute type) of the audio of which the output has been requested. The audio of which the output has been requested may be received in the electronic device 101 through the phone (e.g., through a received call), a message (e.g., a received message), or a social network service. Further, the audio of which the output has been requested may be generated by an application (e.g., a music application, a get-directions application, or a YouTube™ application) being executed by the electronic device 101. The attribute of the audio may correspond to a content type or a purpose of the content type, and the content type may include at least one of speech, a movie, music, or sonification. The processor 120 may classify the first content type (e.g., speech) or the purpose of the first content type as a first audio attribute requiring privacy protection, and may classify the second content type (e.g., movie, music, or sonification) or the purpose of the second content type as a second audio attribute requiring no privacy protection. Such classification is exemplary to help with understanding the disclosure, and the disclosure is not limited to such an example.

Step 405 may be performed before, after, or simultaneously with step 407. This order is merely an implementation issue, and the disclosure is not limited to the explanation.

At step 409, the processor 120 controls the audio output through the vehicle 301 based on the relationship information or the audio attribute. For example, the processor 120 may allow or disallow the audio output through the vehicle 301 based on the relationship information or the audio attribute. The processor 120 may turn on (or activate) a TTS function or may turn off (or deactivate) the TTS function based on the relationship information or the audio attribute.

If the audio of which the output has been requested corresponds to the first audio attribute, the processor 120 may allow the audio output through the vehicle 301 only for a passenger of which the protection level according to the relationship information is the first protection level (e.g., family). Further, if the audio of which the output has been requested corresponds to the first audio attribute, the processor 120 may analyze the text corresponding to the audio, and if a configured word is included in the text, the processor 120 may allow the audio output through the vehicle 301 only for the passenger corresponding to the first protection level.

If the audio of which the output has been requested corresponds to the first audio attribute, and the configured word is not included in the text, the processor 120 may allow the audio output through the vehicle 301 only for the passenger corresponding to the second protection level or the third protection level in accordance with the above relationship information. If the audio of which the output has been requested corresponds to the second audio attribute, the processor 120 may allow the audio output through the vehicle 301 regardless of the relationship information. Further, if the audio of which the output has been requested corresponds to the second audio attribute, the processor 120 may determine whether to perform the audio output through the vehicle 301 based on the relationship information.

If the audio of which the output has been requested corresponds to the first audio attribute, the configured word is included in the text, and/or the protection level according to the relationship information is not the first protection level, the processor 120 may disallow the audio output through the vehicle 301. If the processor 120 disallows the audio output through the vehicle 301, the processor 120 may determine whether the electronic device 101 is connected to another audio output device (e.g., a wireless audio output device) excluding the vehicle 301. If the electronic device 101 is connected to the wireless audio output device, the processor 120 may allow the audio output through the wireless audio output device.

If the audio of which the output has been requested corresponds to the second audio attribute, the processor 120 may allow the audio output through the vehicle 301 based on the protection level in accordance with the relationship information. If the audio of which the output has been requested corresponds to the second audio attribute, and the configured word is included in the text through analysis of the text corresponding to the audio, the processor 120 may allow the audio output through the vehicle 301 only for the first protection level. Further, if the audio of which the output has been requested corresponds to the second audio attribute, and the configured word is not included in the text, the processor 120 may allow the audio output through the vehicle 301 based on whether the protection level corresponds to the second protection level or the third protection level in accordance with the relationship information.

Further, if the audio of which the output has been requested corresponds to the first audio attribute, and the protection level does not correspond to the first protection level in accordance with the relationship information, the processor 120 may disallow the audio output through the vehicle 301. If the audio of which the output has been requested corresponds to the first audio attribute, the protection level does not correspond to the first protection level in accordance with the relationship information, and the electronic device 101 is connected to another audio output device (e.g., wireless audio output device) excluding the vehicle 301, the processor 120 may allow the audio output through the audio output device.

Figure 5:
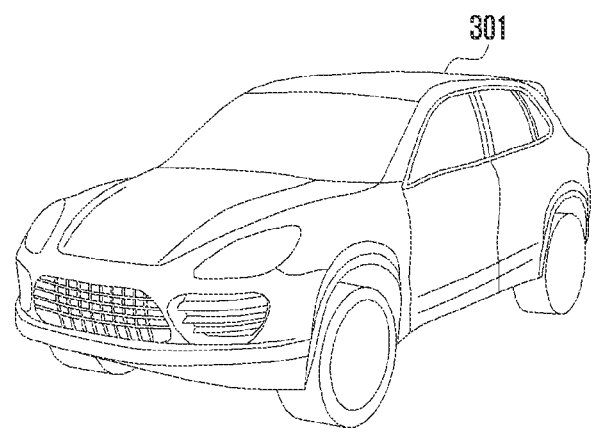
FIG. 5 is a diagram illustrating guidance from an electronic device to a vehicle, according to an embodiment.
Figure 5:
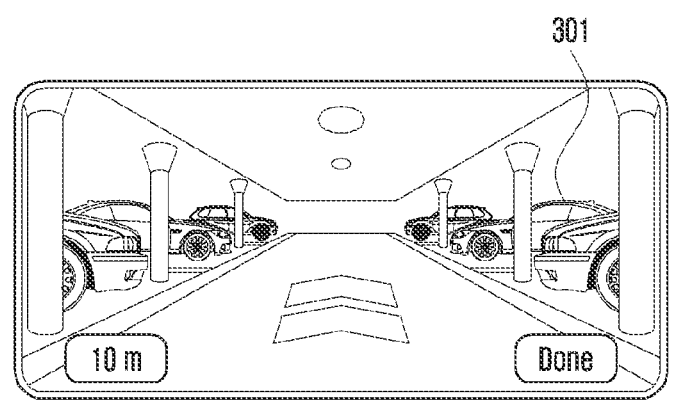

FIG. 5 is a diagram illustrating guidance from an electronic device to a vehicle, according to an embodiment.

With reference to FIG. 5, the electronic device may provide a guide on which the vehicle 301 moves based on the location of the vehicle 301. The electronic device 101 may execute at least one camera 180 corresponding to an augmented reality (AR) application, connected to the vehicle 301 through the UWB communication, and provide a user interface 510 for guiding a way on which the vehicle 301 moves based on the image (or preview image) obtained from the camera 180 and UWB reception information. The user interface 510 may provide a path for moving to the location of the vehicle 301 on the image. Further, the user interface 510 may provide a path for moving from the current location of the electronic device 101 to the location of the vehicle 301 on a map.

Figure 6:
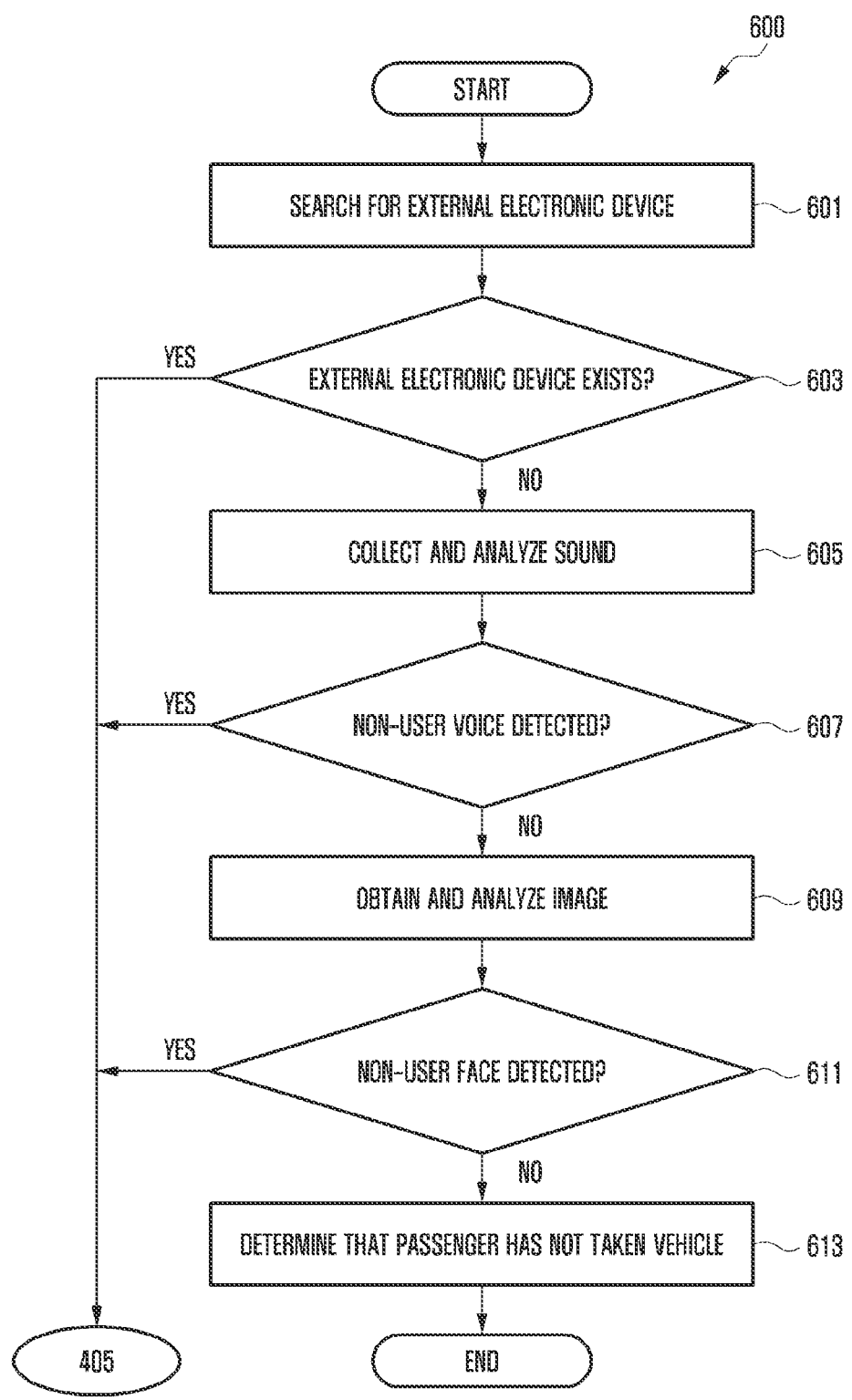
FIG. 6 is a flowchart illustrating a method for determining existence/nonexistence of a passenger by an electronic device, according to an embodiment.

FIG. 6 is a flowchart 600 illustrating a method for determining existence/nonexistence of a passenger by an electronic device, according to an embodiment. The flowchart 600 of FIG. 6 may embody step 403 of FIG. 4.

With reference to FIG. 6, at step 601, the processor 120 of the electronic device 101 searches for external electronic devices. The processor 120 may search for the external electronic device possessed by the passenger in order to determine the existence/nonexistence of the passenger in the vehicle in step 603. The electronic device is a device that may be carried, and if the passenger is present in the vehicle, the external electronic device possessed by the passenger may be searched for. The external electronic device is an electronic device possessed by the passenger, and is commonly called the external electronic device different from the electronic device 101 possessed by the user. The disclosure is not limited by the above explanation.

Step 605 may be first performed before step 601 or step 609, or step 609 may be performed before step 601 or step 605. Further, steps 601, 605, and 609 may be simultaneously performed. Further, the order of steps being performed may be determined in accordance with the user's configuration or the configuration of the electronic device 101. This is merely an implementation issue, and the disclosure is not limited by the drawing.

The processor 120 may broadcast an advertisement packet (e.g., a BLE advertising packet or ranging poll message) selectively, periodically, or in real time within a communicable range (e.g., BLE or UWB) (e.g., via a scanning process). The external electronic device having received the advertisement packet may transmit a response signal (e.g., a scan response, a scan request, or a ranging response message) for the advertisement packet to the electronic device 101. The processor 120 may determine whether an external electronic device is present around the electronic device 101 depending on whether the response signal for the broadcasted advertisement packet is received. If the response signal is received, the processor 120 may determine the external electronic device is present, and may perform step 405 of FIG. 4.

The processor 120 may identify the phone number (or account) of the external electronic device having transmitted the response signal. The processor 120 may determine whether the phone number has been registered in the contact stored in the memory 130. If the phone number of the external electronic device has been registered in the contact, the processor 120 may identify the group to which the phone number of the external electronic device belongs. The group in which the phone number of the external electronic device belongs may be used when the protection level in accordance with the relationship information is given. The group of the contact may be configured based on the relationship between a user and another person (e.g., a user of the external electronic device), such as family, school, company, or business.

Further, if the response signal is not received, the processor 120 may determine that the external electronic device is not present. However, some passengers may still be present without possessing the external electronic device (e.g., a child). If it is determined that the external electronic device is not present, the processor 120 may perform step 605 in order to determine the existence/nonexistence of the passenger in other ways.

If the external electronic device is not present, at step 605, the processor 120 collects and analyzes sound. The processor 120 may collect (or obtain) ambient sound through at least one microphone (e.g., input module 150 of FIG. 1) for a predetermine time (e.g., 5 sec or 10 sec). The processor 120 may determine whether a non-user voice is detected by analyzing the collected sound. The sound analysis may be an analysis of whether the sound is a human voice, sound of an animal (e.g., a puppy), or noise sound. The processor 120 may store the user's voice in a cloud server (e.g., server 108 of FIG. 1) in accordance with the user's configuration or the configuration of the electronic device 101, and may transmit the collected sound to the server 108. The server 108 may analyze whether a non-user sound is included in the collected sound, and may transmit the analysis result to the electronic device 101.

The microphone included in the electronic device 101 may provide beamforming and directional microphone functions. The directional microphone technology may be a technology to record only the audio of a specific target, such as a zoom-in microphone of a camera. "Beamforming" may mean information being received for multiple channels of the microphone or received from a plurality of microphones at the top and bottom of the electronic device 101. The processor 120 may collect the ambient sound through the beamforming and directional microphone function. For example, the electronic device 101 may include two microphones in a first direction (a front surface, a surface including a display, or a surface including a large-sized display) of the electronic device 101, and at least one microphone in a second direction (e.g., a rear surface, a surface that does not include the display, or a surface including a small-sized display) of the electronic device 101. On the front surface of the electronic device 101, a first microphone may be included on a first side surface (e.g., the top side of the electronic device) corresponding to a short length of two parallel side surfaces of the electronic device 101, and a second microphone may be included on a second side surface (e.g., the bottom side of the electronic device) corresponding to the short length of the two parallel side surfaces of the electronic device 101.

At step 607, the processor 120 determines whether a non-user voice is detected from the collected sound based on the analysis result. For example, the processor 120 may store the user's voice in the memory 130, and may determine whether the sound (e.g., a passenger's voice) excluding the user's voice is included in the collected sound. Further, the processor may determine whether sound excluding the user's voice is included in the collected sound based on the analysis result received from the server 108. If the non-user voice is detected from the collected sound, the processor 120 performs step 405 of FIG. 4, and if the non-user voice is not detected from the collected sound, the processor 120 performs step 609. In case of a person who does not speak, he/she may be a passenger and take the vehicle 301 with the user, but his/her voice may not be detected. If the passenger's voice is not detected, the processor 120 performs step 609 in order to determine the existence/nonexistence of the passenger in other ways.

At step 609, the processor 120 obtains an image (or preview image) from at least one camera 180, and analyzes the obtained image. The electronic device 101 may include at least one first camera module in the first direction (the front surface, the surface including the display, or the surface including the large-sized display) of the electronic device 101, and at least one second camera module in the second direction (e.g., the rear surface, the surface that does not include the display, or the surface including the small-sized display) of the electronic device 101. The first direction and the second direction may be directions opposite to each other. The processor 120 may obtain the image from the camera module 180 by driving the camera module 180. The image may be a preview image obtained in real time from the camera module 180.

The user may take the vehicle 301, and may mount the electronic device 101 on one portion (e.g., a dashboard) of the vehicle 301. In a state that the electronic device 101 is mounted on the dashboard of the vehicle 301, a front camera of the electronic device 101 can photograph seats (e.g., the driver's seat, the passenger's seat, and the rear seat) in the vehicle 301. The processor 120 may detect a rotation direction of the electronic device 101 through the gyro sensor (e.g., sensor module 176 of FIG. 1), and if the user takes the vehicle 301, and the rotation direction corresponds to a configured direction (e.g., a vertical direction, a standing state, or a horizontal direction), the processor 120 may obtain the image by driving the front camera. Further, if the configured speed (e.g., a speed faster than walking or running speed) is detected by the acceleration sensor, and the configured application (e.g., a get-directions application) is executed, the processor 120 may obtain the image by driving the front camera.

The camera module 180 may include at least one of an ultra-wide angle camera, a wide angle camera, a telephoto camera, or an internal front camera. The respective cameras may have different pixels, viewing angles, aperture values, and optical image stabilizers (OIS). The OIS may be a hand-shaking prevention function. The ultra-wide angle camera may have a viewing angle of about 120 degrees and an aperture value of FF/2.2 (where "FF/" followed by a number refers to an f-number), and may not provide the OIS. The wide angle camera may have a viewing angle of about 80 degrees and an aperture value of FF/1.8, and may provide the OIS. The telephoto camera may have a viewing angle of 20 to 80 degrees and an aperture value of FF/2.4, and may provide the OIS. The internal front camera may have a viewing angle of about 80 degrees and an aperture value of FF/2.2, and may not provide the OIS. The disclosure is not limited by the above explanation. In order to recognize a face from the image, the processor 120 may change the camera for detecting a non-user, or may widen the viewing angle through a stereo vision process. The processor 120 may measure a distance from a subject by using a time of flight (TOF) camera.

At step 611, the processor 120 determines whether a non-user face is detected. The processor 120 may pre-store the user's face image in the memory 130 in order to identify whether a passenger is present in the vehicle. The processor 120 may perform face recognition (e.g., subject recognition) from the image, and may determine whether a face excluding the user's face stored in the memory 130 is detected from the recognized faces. The face recognition may include whether a non-user face is detected or how many faces are detected. Further, for face recognition, the processor 120 may transmit the image to the server 108, and may receive the analysis result from the server 108. The server 108 may pre-store the user's face, and may transmit the analysis result including whether other faces excluding the user's face are recognized to the electronic device 101 through comparison of the face recognized from the image with the stored user's face.

If the non-user face is detected (e.g., if a face other than the user's face is recognized), the processor 120 performs step 405 of FIG. 4, and if the non-user face is not detected, the processor 120 performs step 613. In case of some subjects (e.g., a baby or a small animal), the face may not be recognized. If the non-user face is not detected (e.g., if a face other than the user's face is not recognized), the processor 120 performs step 613.

At step 613, the processor 120 determines that a passenger has not taken the vehicle. In case an external electronic device is not searched for, a non-user voice is not detected, and a non-user face is not detected, the processor 120 may determine that the passenger has not taken the vehicle 301. If only the user has taken the vehicle 301, the processor 120 may output the audio of which the output has been requested through the audio output unit in the vehicle 301.

Figure 7A:
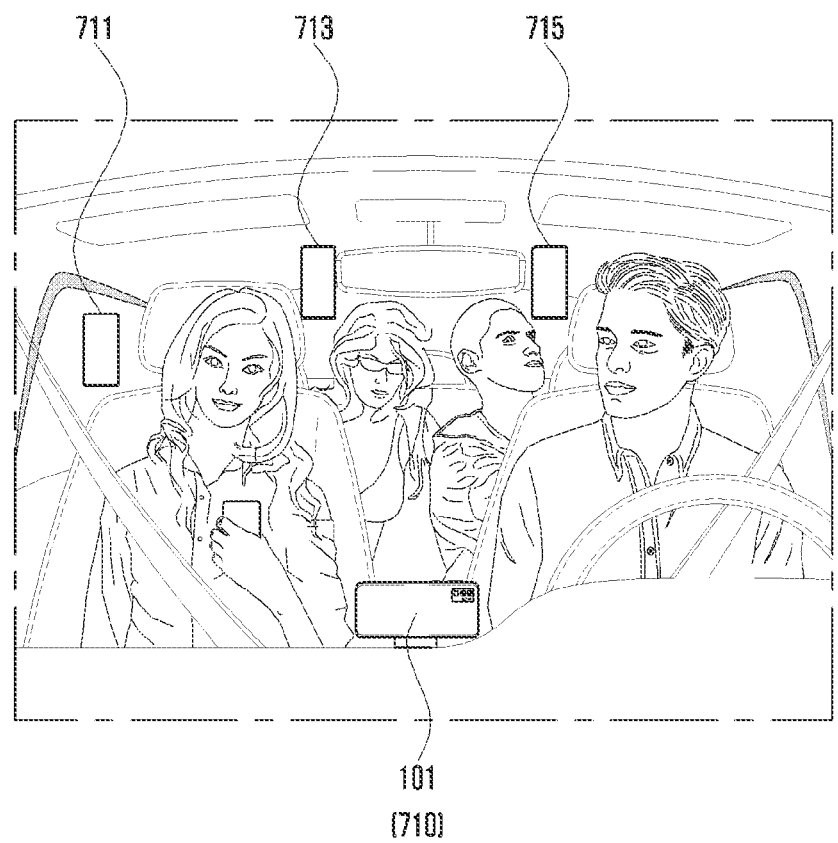
FIGS. 7A to 7C are diagrams illustrating determining existence/nonexistence of a passenger by an electronic device, according to various embodiments.
Figure 7B:
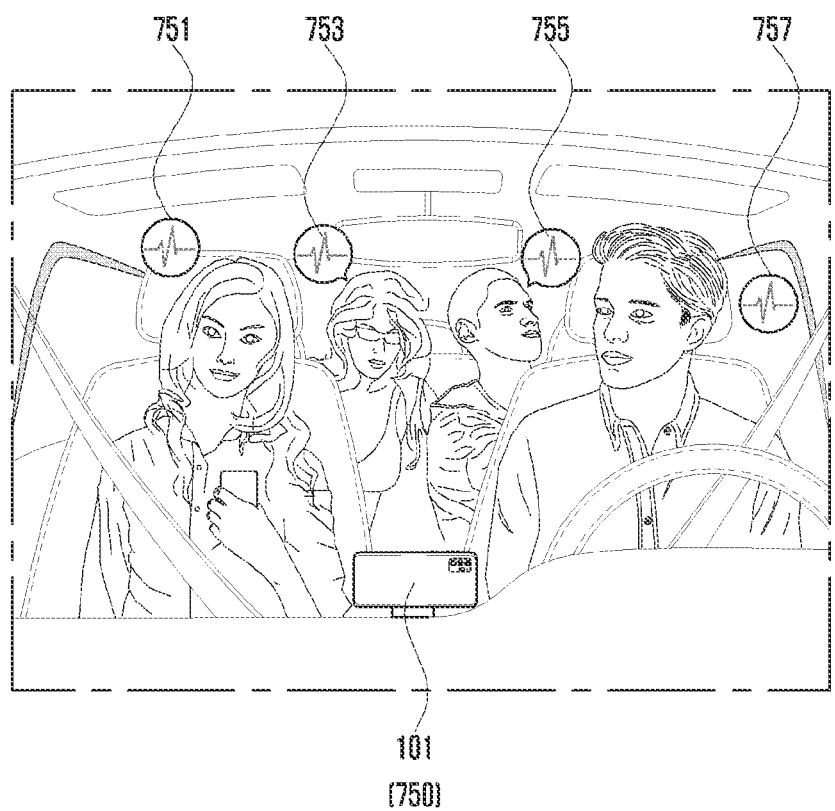
Figure 7C:
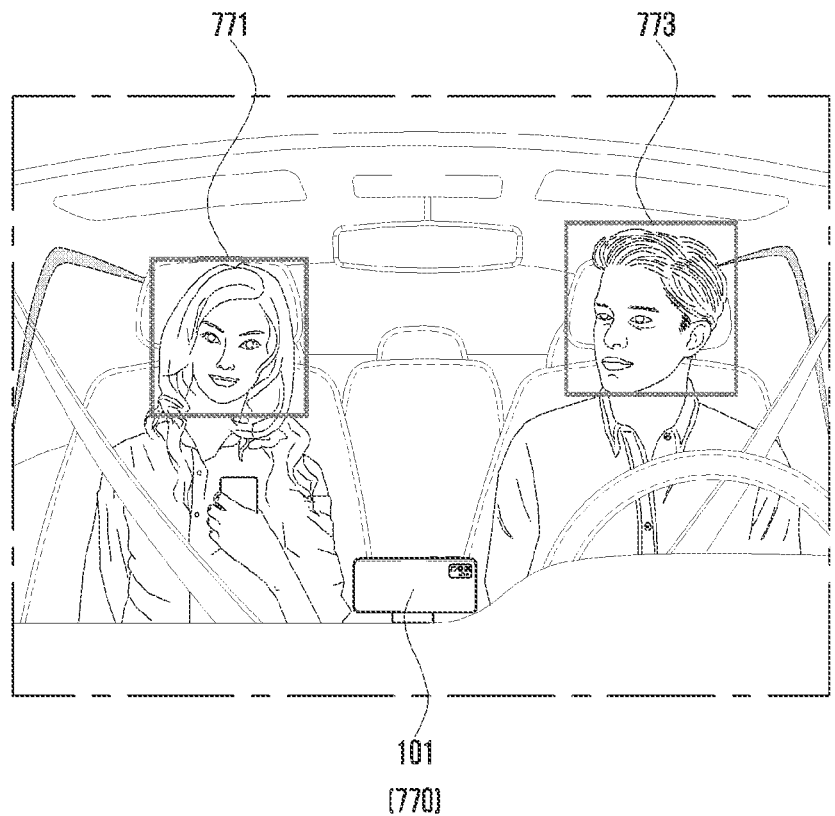
Figure 7C:
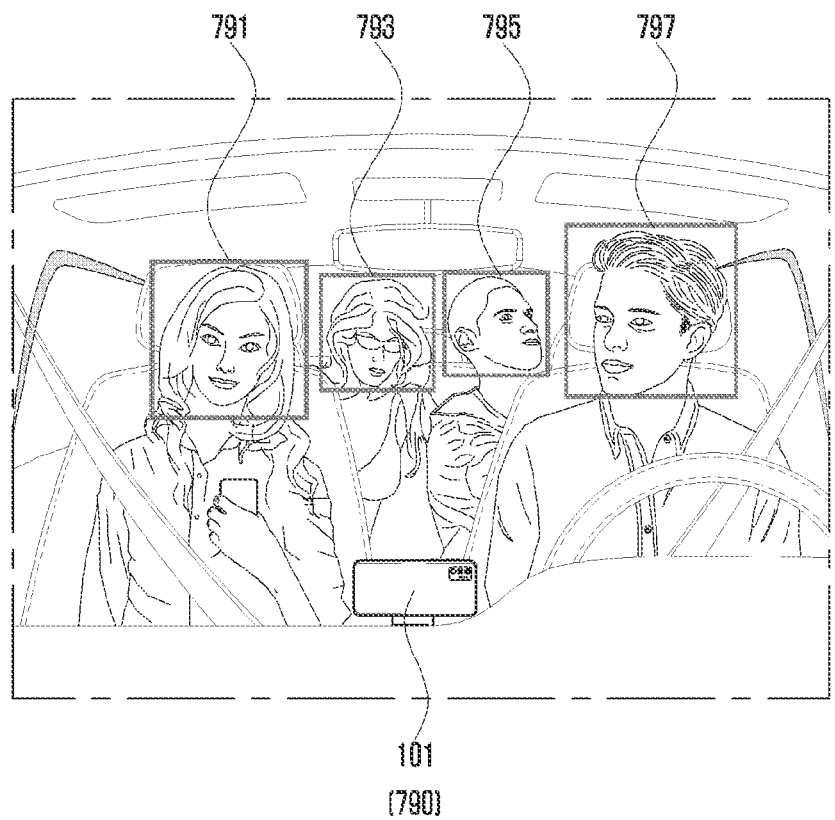

FIGS. 7A to 7C are diagrams illustrating examples of determining existence/nonexistence of a passenger by an electronic device according to various embodiments.

FIG. 7A is a diagram illustrating searching for an external electronic device by an electronic device, according to an embodiment.

With reference to FIG. 7A, the electronic device 101 may search for at least one external electronic device 711, 713, and 715 based on detection that the user has taken the vehicle 301.

A first passenger identification method 710 may be used to search for the at least one external electronic device 711, 713, and 715. If the user has taken the vehicle 301, the user may mount the electronic device 101 on the dashboard of the vehicle 301. The electronic device 101 may search for the external electronic device that is present in a communicable range (e.g., in the vehicle 301) through the scanning process. For example, it may be assumed that four persons including the user have taken the vehicle. The electronic device 101 may search for a first external electronic device 711, a second external electronic device 713, or a third external electronic device 715 through the scanning process (e.g., a BLE advertising packet or ranging poll message broadcast).

The electronic device 101 may be a user's (e.g., driver's) electronic device, the first external electronic device 711 may be an electronic device of a first passenger, the second electronic device 713 may be an electronic device of a second passenger, and the third external electronic device 715 may be an electronic device of a third passenger. The electronic device 101 may receive response signals for the broadcasted advertisement packet from the first external electronic device 711 to the third external electronic device 715. If the response signals are received, the electronic device 101 may determine that passengers are present in the vehicle 301.

The electronic device 101 may identify phone numbers and accounts of the first external electronic device 711 to the third external electronic device 715 based on the response signals. The electronic device 101 may provide a user interface for connecting to at least one of the first external electronic device 711 to the third external electronic device 715 based on the response signals. If a connection request (e.g., via a touch, a gesture, a voice, or a push of a button) is received from the user, the electronic device 101 may be connected to at least one of the first external electronic device 711 to the third external electronic device 715, of which the connection has been requested.

FIG. 7B is a diagram illustrating identifying existence/nonexistence of a passenger through analysis of sound by an electronic device, according to an embodiment.

With reference to FIG. 7B, the electronic device 101 may collect and analyze sound in the vehicle 301. The electronic device 101 may collect (or obtain) ambient sound through at least one microphone (e.g., input module 150 of FIG. 1) for a predetermine time (e.g., 5 sec or 10 sec). The electronic device 101 may determine whether a non-user voice is detected by analyzing the collected sound.

A second passenger identification method 750 may be used to collect and analyze the ambient sound. The sound analysis may be an analysis of whether the sound is a human voice, a sound of an animal (e.g., a puppy), or a noise sound. The electronic device 101 may collect voice 751 of the first passenger, voice 753 of the second passenger 753, voice 755 of third passenger, and voice 757 of the user (e.g., driver) using the directional microphone function.

The electronic device 101 may store the user's voice in the memory 130, and may determine whether sound excluding the user's voice is included in the collected sound (e.g., voice 751 of the first passenger, voice 753 of the second passenger 753, voice 755 of third passenger, and voice 757 of the user (e.g., driver)). The electronic device 101 may store the user's voice in the cloud server 108 in accordance with the user's configuration or the configuration of the electronic device 101, and may transmit the collected sound to the server 108. The server 108 may analyze whether sound excluding the user's voice is included in the collected sound, and may transmit the analysis result to the electronic device 101.

FIG. 7C is a diagram illustrating identifying existence/nonexistence of a passenger through analysis of images by an electronic device, according to an embodiment.

With reference to FIG. 7C, the electronic device 101 may obtain an image (or preview image) from at least one camera 180, and may analyze the obtained image.

Third passenger identification methods 770 and 790 may be used to obtain and analyze the image. The user may take the vehicle 301, and may mount the electronic device 101 on one portion (e.g., dashboard) of the vehicle 301. In a state that the electronic device 101 is mounted on the dashboard of the vehicle 301, a front camera of the electronic device 101 can photograph seats (e.g., a driver's seat, a passenger's seat, and a rear seat) in the vehicle 301. The camera module 180 may include at least one of an ultra-wide angle camera, a wide angle camera, a telephoto camera, or an internal front camera. The respective cameras may have different pixels, viewing angles, aperture values, and OIS. In order to recognize a face from the image, the electronic device 101 may change the camera for detecting a non-user, or may widen the viewing angle through a stereo vision process.

If two persons have taken the vehicle 301, as in method 770, the electronic device 101 may recognize (or detect) a first face 771 and a second face 773 through face recognition from the image. The electronic device 101 may determine whether a face (e.g., the first face 771) excluding the user's face (e.g., the second face 773) stored in the memory 130 is detected from the recognized faces. If the face (e.g., the first face 771) excluding the user's face (e.g., the second face 773) is detected from the image, the electronic device 101 may determine that the passenger is present in the vehicle 301. Further, the electronic device 101 may transmit the image to the server 108, and may receive the analysis result (e.g., existence/nonexistence of the passenger) from the server 108.

Further, if four persons have taken the vehicle 301, as in method 790, the electronic device 101 may recognize (or detect) a first face 791, a second face 793, a third face 795, and a fourth face 797 through face recognition from the image. The electronic device 101 may determine whether a face (e.g., the first face 791) excluding the user's face (e.g., the second face 793) stored in the memory 130 is detected from the recognized faces. If faces (e.g., the first face 791 to third face 795) excluding the user's face (e.g., the fourth face 797) are detected from the image, the electronic device 101 may determine that the passengers are present in the vehicle 301.

Figure 8:
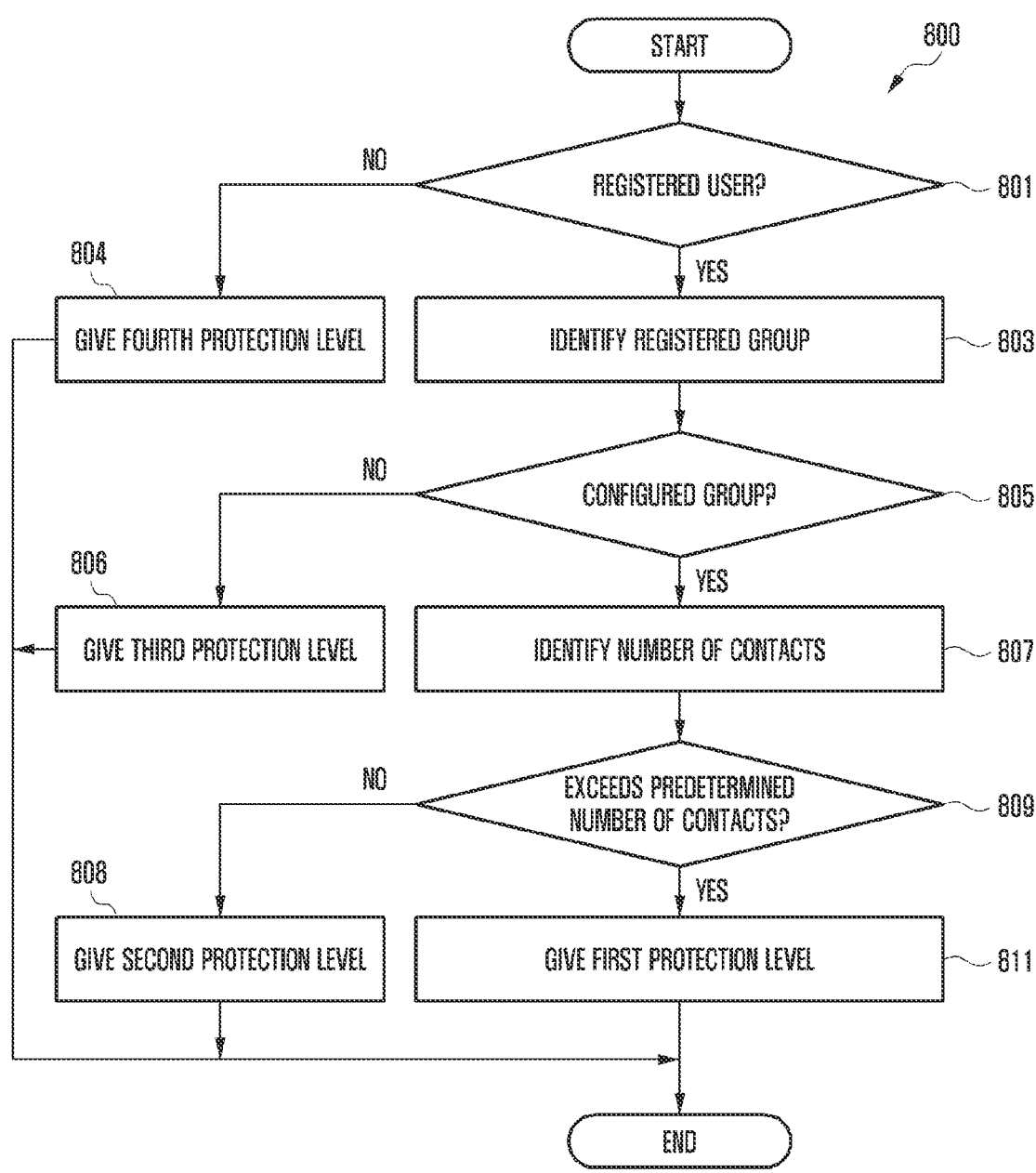
FIG. 8 is a flowchart illustrating a method for giving a protection level based on relationship information by an electronic device, according to an embodiment.

FIG. 8 is a flowchart 800 illustrating a method for giving a protection level based on relationship information by an electronic device, according to an embodiment. The flowchart 800 of FIG. 8 may embody step 405 of FIG. 4. The flowchart 800 of FIG. 8 may be performed through relationship based analysis.

With reference to FIG. 8, at step 801, the processor 120 of the electronic device 101 determines whether a passenger in the vehicle 301 is a registered user. The processor 120 may determine whether the passenger is a registered user through at least one of an external electronic device search, sound search, or image analysis. For example, the processor 120 may determine whether the searched phone number (or account) of the external electronic device is stored in the memory 130. In case that the phone number (or account) is stored in the memory 130, the processor 120 may determine that the passenger is a registered user. Further, the processor 120 may store voices of other persons (e.g., a family member or close friend) in the memory 130, and if the voice of the passenger through the sound analysis corresponds to the voice of another person stored in the memory 130, the processor 120 may determine that the passenger is the registered user. Further, the processor 120 may store a face image of another person in the memory 130, and if the face of the passenger determined through image analysis corresponds to the face of another person stored in the memory 130, the processor 120 may determine that the passenger is the registered user.

In case of storing the voice of another person or the face of another person in the memory 130, the phone number (or account) of another person may be matched to stored information. For example, the voice of another person or the face of another person may be stored to correspond to the phone number of the external electronic device stored in the contact.

If the passenger is the registered user, the processor 120 performs step 803, whereas if the passenger is not the registered user, the processor 120 performs step 804.

If the passenger is not the registered user, the processor 120, at step 804, gives the fourth protection level to the passenger in the vehicle 301. The fourth protection level may mean the lowest level of privacy. If the passenger has nothing to do with the user of the electronic device 101 (e.g., if the passenger is a stranger), the processor 120 may give the fourth protection level. If the fourth protection level is given, the processor 120 may disallow the audio output through the vehicle 301 regardless of the audio attribute. Further, if the fourth protection level is given, the processor 120 may selectively allow the audio output through vehicle 301 only in case that the audio attribute is not the configured attribute (e.g., the first audio attribute) (e.g., music reproduction). If the fourth protection level is given, the processor 120 may turn off the TTS function.

If the number of passengers in the vehicle 301 exceeds one, and the fourth protection level is given to any one passenger, the processor 120 may omit the following operation. Further, in accordance with the user's configuration or the configuration of the electronic device 101, even if the number of passengers in the vehicle 301 exceeds one, and the fourth protection level is given to any one passenger, the processor 120 may perform the following operation. The processor 120 may give the protection level to all passengers in the vehicle 301, or may give the protection level to any one passenger. This is merely an implementation issue, and the disclosure is not limited by the explanation.

In case of the registered user, the processor 120, at step 803, identifies a group to which the passenger belongs. The group may be one to distinguish another person in accordance with the configuration of the user, such as family, friend, close friend, acquaintance, school, or company.

At step 805, the processor identifies whether the group to which the passenger belongs is a configured (or designated) group. The configured group may be one directly configured by the user or configured by default in the electronic device 101.

If the group to which the passenger belongs is the configured group (e.g., family or close company), the processor 120 performs step 807, whereas if the group to which the passenger belongs is not the configured group, the processor 120 performs step 806.

If the group to which the passenger belongs is not the configure group, the processor 120, at step 806, gives the third protection level to the passenger in the vehicle 301. The third protection level may be a level having higher privacy than the privacy of the fourth protection level. If the third protection level is given, the processor 120 may selectively allow the audio output through the vehicle 301 only in case that the audio attribute is not the configured attribute (e.g., the first audio attribute). Further, the processor 120 may selectively allow the audio output through the vehicle 301 only in case that the audio attribute is not the configured attribute (e.g., the first audio attribute), and a configured word is not included in a text corresponding to the audio of which the output has been requested. If the third protection level is given, the processor 120 may turn off the TTS function, or may selectively turn on the TTS function.

If the group to which the passenger belongs is the configured group, the processor 120, at step 807, identifies the number of contacts with the passenger. Based on the phone number or account of the passenger, the processor 120 may determine how frequently the user of the electronic device 101 gets in touch with the passenger through the phone, message (or messenger), or social network service.

At step 809, the processor 120 determines whether the identified number of contacts exceeds the configured number of contacts. The configured number of contacts may be differently configured by respective media (e.g., phone, message, or social network service), or may be configured as the number of contacts through integration of all media. The configured number of contacts may be directly configured by the user, or may be configured by default in the electronic device 101.

The processor 120 may determine relationship information based on the configured account, phone number, text, or call (or voice). For example, if the talk time (or sum of talk time for a predetermine time) corresponding to the account or phone number of the passenger exceeds a predetermined time (e.g., 3 min, 5 min, or 10 min), or if the text related to intimacy is included in the contents of the message, the processor 120 may give the weight value of 2 (or 3). If the talk time is less than or equal to the predetermined time, or if the text related to the intimacy is not included in the contents of the message, the processor 120 may give the weight value of 0.5 (or 1). If the weight value is large even if the number of contacts is small, the processor 120 may count a higher number of contacts with respect to the passenger who has made a lot of calls or who has had a friendly conversation. Further, if the weight value is small even if the number of contacts is large, the processor 120 may count a smaller number of contacts with respect to the passenger who has made less calls or who has had a conversation without intimacy. Such an example is merely to help understanding of the disclosure, and does not limit the contents of the disclosure.

If the identified number of contacts exceeds the configured number of contacts, the processor 120 performs step 811, whereas if the identified number of contacts does not exceed the configured number of contacts, the processor 120 performs step 808.

If the identified number of contacts does not exceed the configured number of contacts (e.g., if the identified number of contacts is less than or equal to the configured number of contacts), the processor 120, at step 808, gives the second protection level with respect to the passenger in the vehicle 301. The second protection level may be a level having higher privacy than the privacy of the third protection level. If the second protection level is given, the processor 120 may selectively allow the audio output through the vehicle 301 only in case that the audio attribute is not the configured attribute (e.g., the first audio attribute). Further, if the second protection level is given, the processor 120 may selectively allow the audio output through the vehicle 301 only in case that the configured word is not included in the text corresponding to the audio of which the output has been requested. If the second protection level is given, the processor 120 may turn off the TTS function, or may selectively turn on the TTS function.

If the identified number of contacts exceeds the configured number of contacts, the processor 120, at step 811, gives the first protection level with respect to the passenger in the vehicle 301. The first protection level is the level having the highest privacy, and may be the level having higher privacy than the privacy of the second protection level. If the first protection level is given, the processor 120 may allow the audio output regardless of the audio attribute. If the first protection level is given, the processor 120 may turn on the TTS function.

FIG. 8 helps explain how the protection levels are given differently in accordance with the configured group or the number of contacts, and the disclosure is not limited by such an example. In addition, step 805 may first be performed before step 801 and/or step 809 may be performed after step 805, or step 809 may first be performed, and then step 801 and/or step 805 may be performed after step 809. Further, steps 801, 805, and 809 may be simultaneously performed. Further, the order of operations being performed may be determined in accordance with the user's configuration or the configuration of the electronic device 101. This is merely an implementation issue, and the disclosure is not limited by the drawing.

Figure 9:
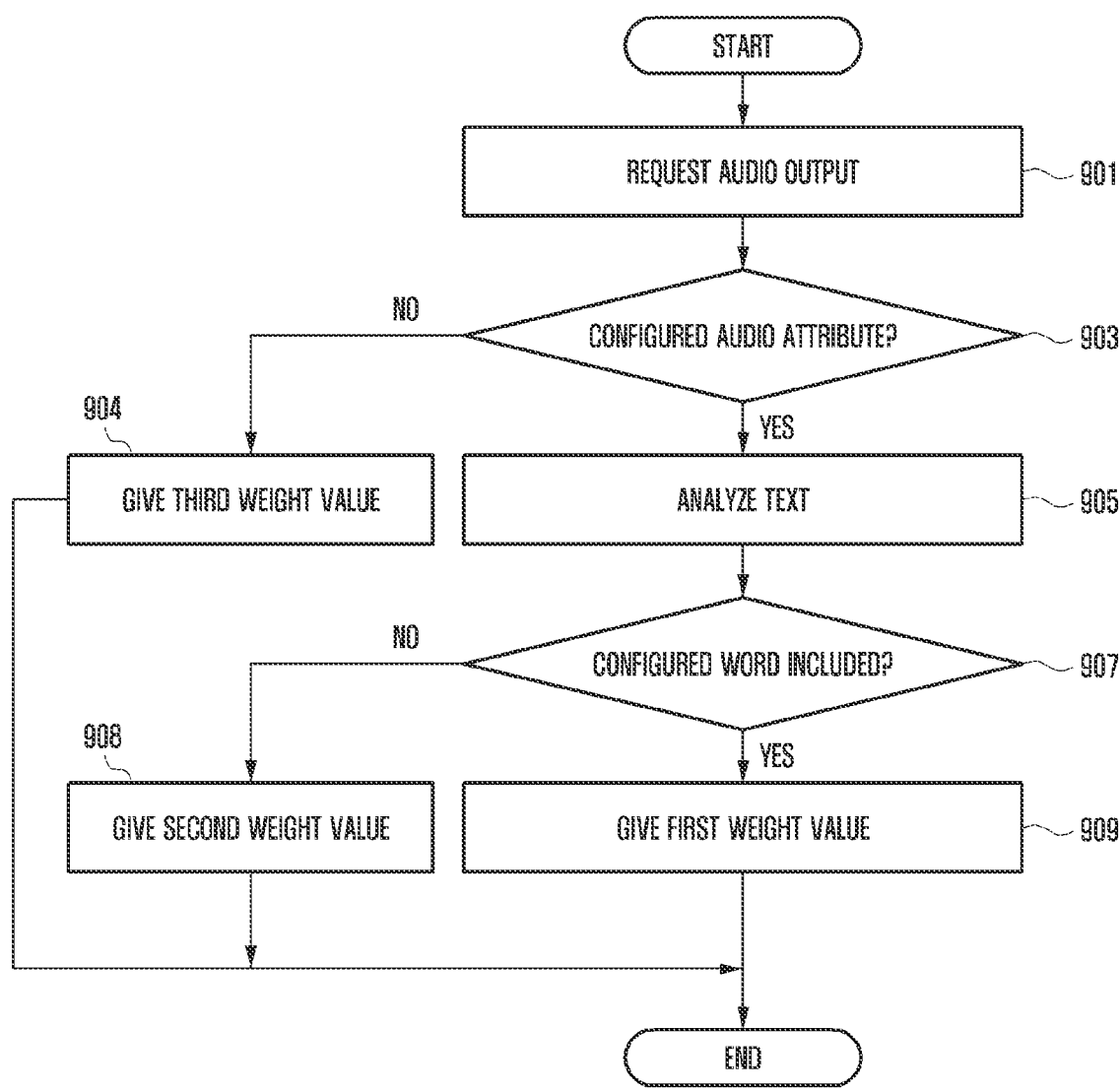
FIG. 9 is a flowchart illustrating a method for giving a weight value based on an audio attribute by an electronic device, according to an embodiment.

FIG. 9 is a flowchart 900 illustrating a method for giving a weight value based on an audio attribute by an electronic device, according to an embodiment. The flowchart 900 of FIG. 9 may embody step 407 of FIG. 4.

With reference to FIG. 9, at step 901, the processor 120 of the electronic device 101 requests audio output. The audio output may be one that is received by the electronic device 101 through the phone (e.g., a received call), message (e.g., a received message), or social network service. Further, the audio of which the output has been requested may be one that is generated by an application (e.g., a music application, a get-directions application, or a YouTube™ application) being executed by the electronic device 101. The processor 120 may identify the attribute of the audio of which the output has been requested. The attribute of the audio may correspond to a content type, and may include at least one of speech, movie, music, or sonification.

At step 903, the processor 120 determines whether the attribute of the audio of which the output has been requested is the configured attribute. An audio player may define that an audio system defines a method for processing a routing, volume, and focus determination related to a designated source. The application 210 may give the attribute to an audio reproduction, such as music being reproduced through a streaming service or a new e-mail notification, and then may transfer the audio attribute (or audio source attribute) to the framework 230. In the framework 230, the audio system may determine mixing using the audio attribute, and may notify the application of the system state. The application 210 may provide information including at least one of a usage (e.g., a reason of reproduction), content type (e.g., a source to be reproduced), flag (e.g., a source reproduction method), or context to the audio system.

The content type may define what sound is, and may represent a general category of the content, such as movie, voice, or beeping/ringtone. The framework 230 may selectively configure an audio post-processing block based on the content type. For example, the framework 230 may use CONTENT_TYPE_MOVIE as the content type through a movie streaming application, and may use CONTENT_TYPE_MUSIC as the content type through a music reproduction application. The usage may include information on the reason of sound reproduction and a target to use the sound through designation of the context for which the stream is used.

Hereinafter, the attribute of the audio of which the output has been requested may be determined based on at least one of the content type or usage. The content type may include at least one of speech, movie, music, or sonification. The processor 120 may classify the first content type (e.g., speech) or the usage of the first content type as the first audio attribute that requires privacy protection, and may classify the second content type (e.g., movie, music, or sonification) or the usage of the second content type as the second audio attribute that does not require the privacy protection. Based on the attribute of the audio, the processor 120 may give the weight values by audios of which the output has been requested differently. The content type may be classified as in Table 1, shown below.

TABLE 1

| First content type | Second content type |
|---|---|
| CONTENT_TYPE_SPEECH | CONTENT_TYPE_MOVIECONTENT_TYPE_MUSIC CONTENT_TYPE_SONIFICATION |

The CONTENT_TYPE_SPEECH may be used when the content (an application) is voice, the CONTENT_TYPE_MOVIE may be used when the content is a sound track being provided together with movie or TV program, the CONTENT_TYPE_MUSIC may be used when the content is music, and the CONTENT_TYPE SONIFICATION may be used when the content is sound being involved in a user work, such as a warning sound or sound effect expressing a key click, or an event, such as a sound type for a bonus being received in a game. The processor 120 may determine the audio attribute by identifying the content type of the audio of which the output has been requested.

The content type usages may be classified as in Table 2, shown below.

TABLE 2

| Usage of first content type | Usage of second content type |
|---|---|
| USAGE_ASSISTANCE_ACCESSIBILITYUSAGE_ASSISTANCE USAGE_VOICE_COMMUNICATION_SIGNALING | USAGE_ALARM USAGE_GAME USAGE_MEDIA USAGE_ASSISTANCE_SONIFICATION USAGE_ASSISTANCE_NAVIGATION_GUIDANCE USAGE_NOTIFICATION USAGE_NOTIFICATION_COMMUNICATION_DELAYED USAGE_NOTIFICATION_COMMUNICATION_INSTANT USAGE_NOTIFICATION_COMMUNICATION_REQUEST USAGE_NOTIFICATION_EVENT USAGE_NOTIFICATION_RINGTONE |

The USAGE_ASSISTANCE_ACCESSIBILITY may be used for accessibility, such as a screen reader, the USAGE_ASSISTANT may be used for an audio response to user query, audio instructions, or help utterance, and the USAGE_VOICE_COMMUNICATION_SIGNALLING may be used during calling, the USAGE ALARM may be used when the application (or content) is an alarm, the USAGE GAME may be used for game audio, the USAGE MEDIA may be used for media, such as music or movie sound track, and the USAGE_ASSISTANCE SONIFICATION may be used for sonification, such as user interface sound.

The USAGE_ASSISTANCE_NAVIGATION_GUIDANCE may be used in case that the application is a driving or navigation path, the USAGE_NOTIFICATION may be used for notification, the USAGE_NOTIFICATION_COMMUNICATION_DELAYED may be used for non-instant communication type communication such as an e-mail, the USAGE_NOTIFICATION_COMMUNICATION_INSTANT may be used for notification of an instant communication, such as chatting or SMS, the USAGE_NOTIFICATION_COMMUNICATION_REQUEST may be used as an entry/close request for communication, such as voice over Internet protocol (VoIP) communication or video conference, the USAGE_NOTIFICATION EVENT may be used to draw user's attention, such as notification or low battery warning, and the USAGE_NOTIFICATION RINGTONE may be used for phone ringtone.

If the attribute of the audio of which the output has been requested is the configured audio attribute, the processor 120 performs step 905, whereas if the attribute of the audio of which the output has been requested is not the configured audio attribute, the processor 120 performs step 904.

If the attribute of the audio of which the output has been requested is not the configured audio attribute, the processor 120, at step 904, gives the third weight value for the audio of which the output has been requested. The third weight value may mean the lowest weight value. With respect to the audio to which the third weight value is given, the processor 120 may allow the audio output through the vehicle 301. For example, the audio attribute of an application, such as music reproduction, is the second audio attribute, and the processor 120 may determine that the audio is not related to the user's privacy protection.

The processor 120 may give the third weight value based on the user's configuration for the audio of which the output has been requested. For example, if the user of the electronic device has rejected the call or has signed up for spam with respect to a specific user (e.g., a user identified via a phone number or name), the processor 120 may give the third weight value for the audio output corresponding to the specific user. Further, if a call is received with a phone number that is not registered in the contact stored in the memory 130, the processor may give the third weight value for the phone call. If the passenger has taken the vehicle 301, the processor 120 may reject the call from the specific user, to which the third weight value is given, or may block the audio output through the vehicle 301 (e.g., block the audio output when a call is received with an unknown number).

If the attribute of the audio of which the output has been requested is the configured audio attribute, the processor 120, at step 905, analyzes the text. The text analysis may be a determination of whether a privacy-related keyword is included in the text through sentence-based analysis, or a determination of the context of the text. The processor 120 may extract a phone number and name of a person who has called to the electronic device 101, an account (or ID) of the person who has sent a message (or messenger) to the electronic device 101, or the text included in the contents of the message through speech-to-text or text recognition. The processor 120 may analyze the text extracted through a sentence based analysis technology, or may receive the analysis result through transmission of the extracted text to the server 108.

At step 907, the processor 120 determines whether a configured word is included in the text. For example, the configured word is related to the user's privacy, and may be "darling", "honey", or "love". In addition, the non-configured word may correspond to general contents, such as "weather", "temperature", or "news". The word may be configured based on the text, sign (e.g., a heart), or emoticon (a heart emoticon).

If the configured word is included in the text, the processor 120 performs step 909, and if the configured word is not included in the text, the processor 120 performs step 908.

If the configured word is not included in the text, the processor 120, at step 908, gives the second weight value for the audio of which the output has been requested. The second weight value may mean a weight value that is higher than the third weight value. The processor 120 may allow or disallow the audio output through the vehicle 301 with respect to the audio to which the second weight value is given. For example, the audio attribute of a message application is the first audio attribute, and the processor 120 may determine that the audio attribute is related to the user's privacy protection. However, if the configured word is not included in the message sender or the contents of the message, the processor 120 may allow the audio output through the vehicle 301. If the configured word is not included in the message sender or the contents of the message in accordance with the user's configuration or the configuration of the electronic device 101, the processor 120 may disallow the audio output through the vehicle 301. The processor 120 may allow the audio output through the vehicle 301 based on the relationship information on the passenger in the vehicle 301 even in case that the configured word is not included in the message sender or the contents of the message. For example, the processor 120 may allow the audio output through the vehicle 301 in case that the relationship information on the passenger corresponds to the first protection level or the second protection level.

If the configured word is included in the text, the processor 120, at step 909, gives the first weight value for the audio of which the output has been requested. The first weight value may mean a weight value that is higher than the second weight value. The processor 120 may disallow the audio output through the vehicle 301 with respect to the audio to which the first weight value is given. For example, the audio attribute of the message application is the first audio attribute, and the processor 120 may determine that the audio attribute is related to the user's privacy protection. However, if the configured word is included in the message sender or the contents of the message, the processor 120 may disallow the audio output through the vehicle 301. The processor 120 may turn off (or deactivate) the TTS function. Further, the processor 120 may allow the audio output through the vehicle 301 only in case that the relationship information on the passenger corresponds to the configured protection level (e.g., first protection level).

If the audio output through the vehicle 301 is disallowed, the processor 120 may determine whether a user device excluding the vehicle 301 is connected. Further, if the passenger has taken the vehicle 301, and the first weight value is given for the audio of which the output has been requested, the processor 120 may determine whether the user device excluding the vehicle 301 is connected. The user device may be a wireless audio output device that the user wears on the ear. If the user device is connected, the processor 120 may control the audio of which the output has been requested to be output to the user device.

Although it is explained that the configured word in relation to the privacy is included, the first weight value is given, a word is configured corresponding to advertisement or spam, and if the configured word is included, the third weight value may be given, whereas if the configured word is not included, the second weight value may be given. The explanation of FIG. 9 is merely to help understanding of the disclosure, and the disclosure is not limited by the above explanation.

Additionally or alternatively, step 907 may be first performed before step 903, or steps 903 and 907 may simultaneously be performed. Further, the order of operations being performed may be determined in accordance with the user's configuration or the configuration of the electronic device 101. This is merely an implementation issue, and the disclosure is not limited by the drawing.

Figure 10A:
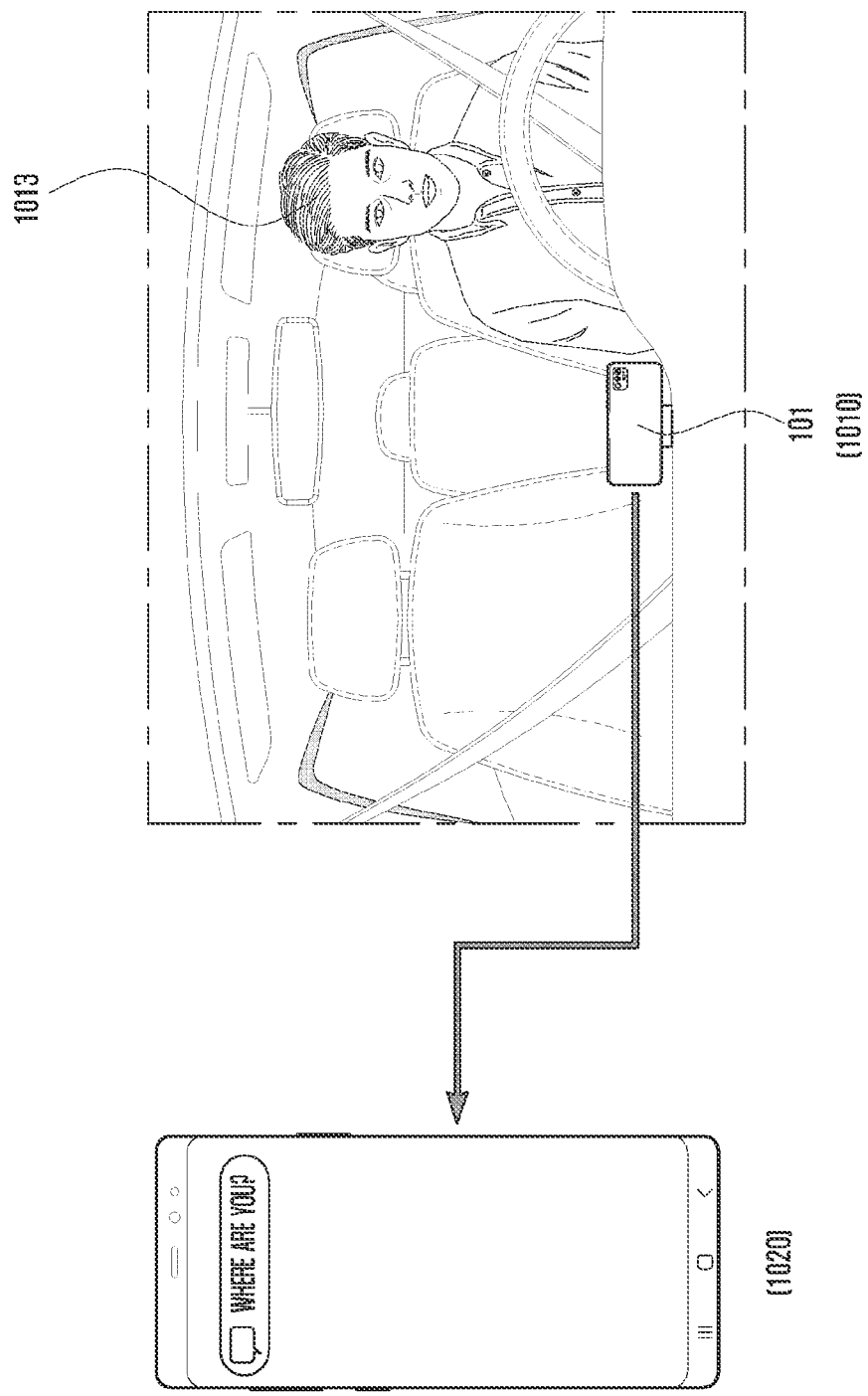
FIGS. 10A and 10B are diagrams illustrating controlling an audio output through a vehicle by an electronic device, according to various embodiments.
Figure 10B:
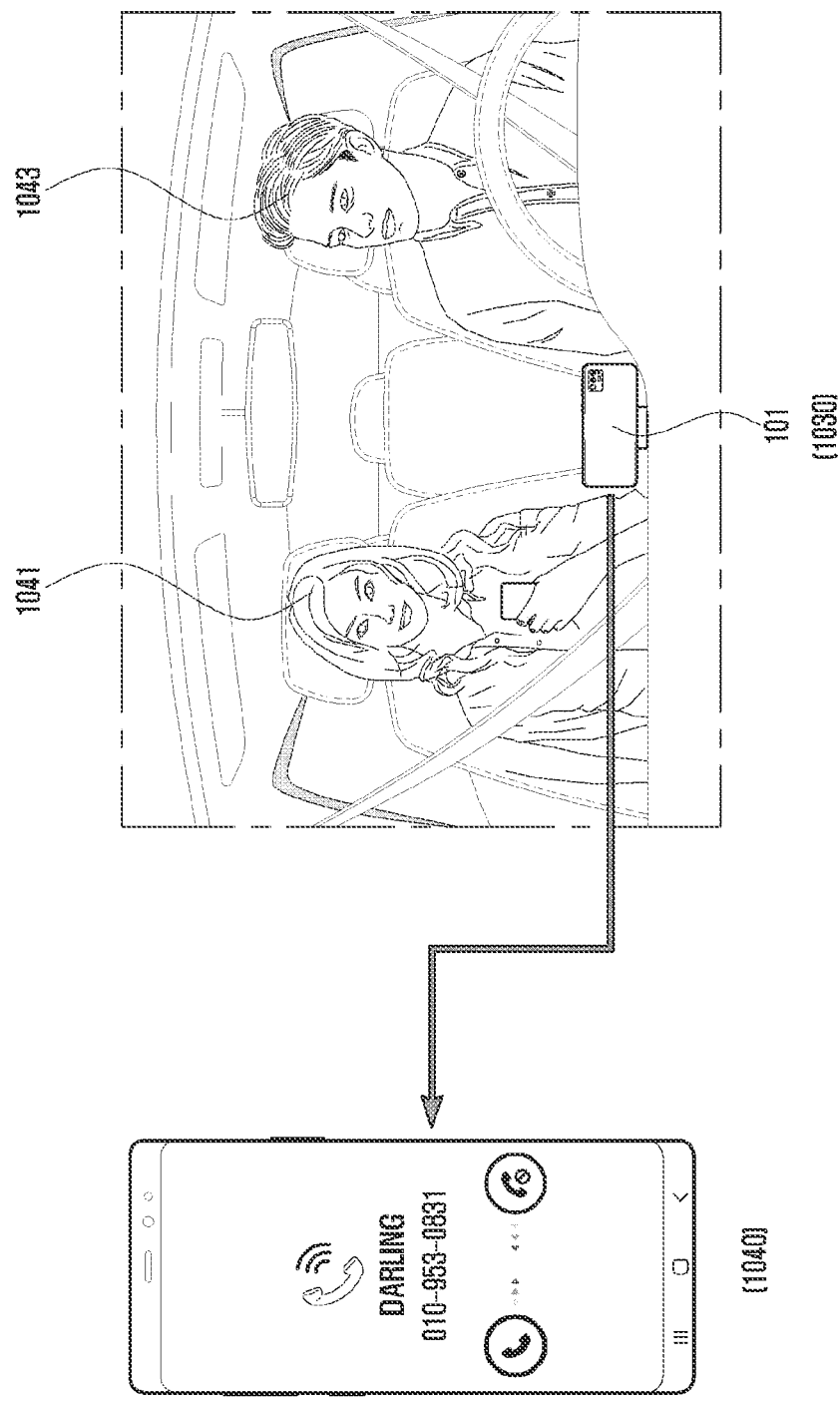

FIGS. 10A and 10B are diagrams illustrating controlling an audio output through a vehicle by an electronic device, according to various embodiments.

FIG. 10A is a diagram illustrating allowing the audio output through the vehicle by the electronic device, according to an embodiment.

Referring to FIG. 10A, if a user 1013 has taken the vehicle 301, the electronic device 101 may determine existence/nonexistence of a passenger in the vehicle 301, and may allow the audio output through the vehicle 301 in case that the passenger is not present in the vehicle 301 in 1010. For example, while the user 1013 takes the vehicle 301, the electronic device 101 may receive a message, such as a first user interface 1020. The electronic device 101 may control the voice corresponding to the message sender (e.g., name or phone number) or the message contents (e.g., where are you?) to be output to the audio output unit of the vehicle 301 through turning on the TTS function.

FIG. 10B is a diagram illustrating disallowing the audio output through the vehicle by the electronic device, according to an embodiment.

Referring to FIG. 10B, if a user 1043 has taken the vehicle 301, the electronic device 101 may determine existence/nonexistence of a passenger in the vehicle 301, and if the passenger 1041 is present in the vehicle 301, the electronic device 101 may disallow the audio output through the vehicle 301. For example, while the user 1043 takes the vehicle 301, the electronic device 101 may receive a call, such as a second user interface 1040. The electronic device 101 may control the audio output through the vehicle 301 based on the relationship information on the passenger 1041 or the audio attribute. For example, if the relationship information on the passenger 1041 corresponds to one of the second protection level to the fourth protection level, and the audio attribute corresponds to the first audio attribute (e.g., phone or CONTENT_TYPE_SPEECH), the electronic device 101 may disallow the audio output through the vehicle 301. Further, if the relationship information on the passenger 1041 corresponds to the second protection level, and the configured word (e.g., "darling") is included in the text corresponding to the audio of which the output has been requested, the electronic device 101 may disallow the audio output through the vehicle 301. If the relationship information on the passenger 1041 corresponds to the second protection level, and the configured word (e.g., darling) is included in the text corresponding to the audio of which the output has been requested, the electronic device 101 may deactivate the TTS function configured in the electronic device 101.

Figure 11A:
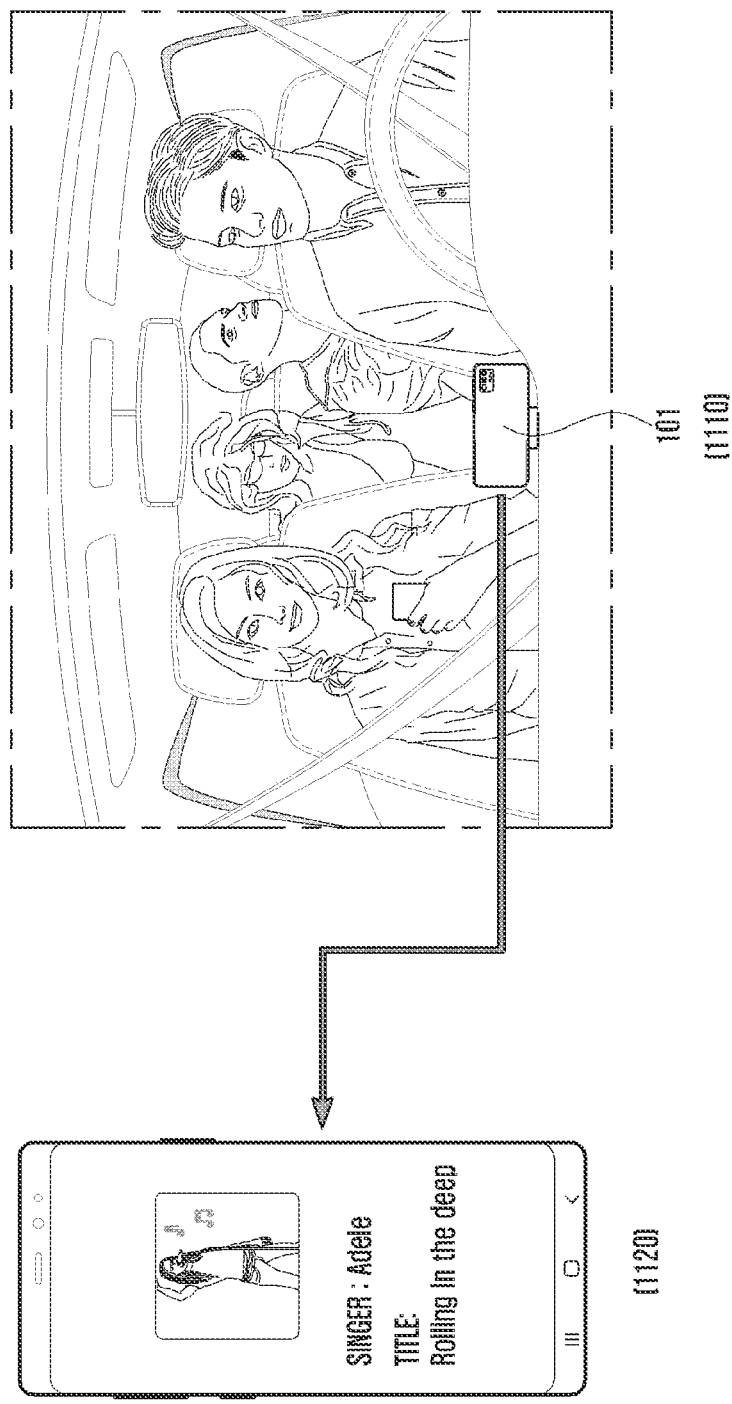
FIGS. 11A and 11B are diagrams illustrating controlling an audio output by an electronic device, according to various embodiments.
Figure 11B:
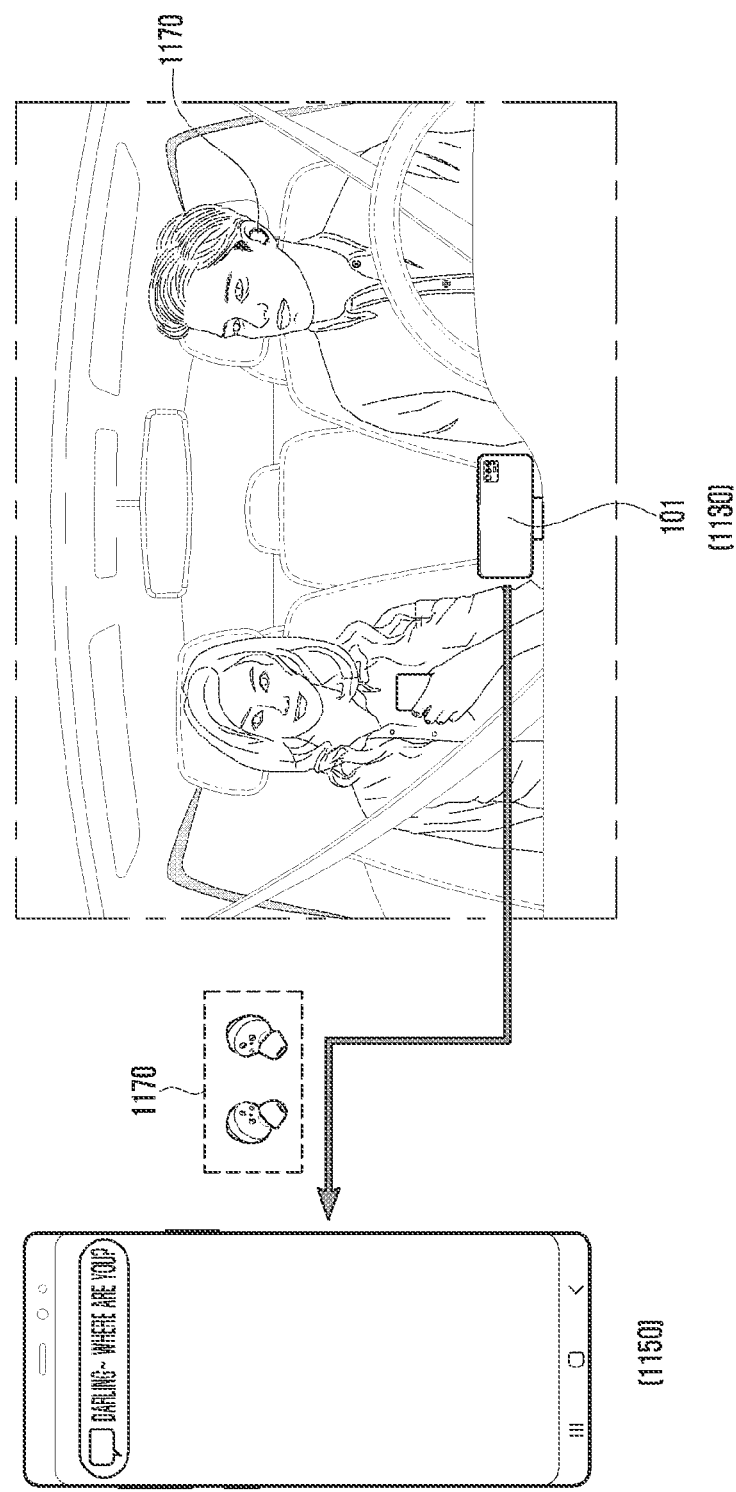

FIGS. 11A and 11B are diagrams illustrating examples of controlling an audio output in an electronic device, according to various embodiments.

FIG. 11A is a diagram illustrating allowing the audio output through the vehicle by the electronic device, according to an embodiment.

Referring to FIG. 11A, if a user (e.g., a driver) has taken the vehicle 301 of FIG. 3, the electronic device 101 may determine existence/nonexistence of a passenger in the vehicle 301, and if the passenger is present in the vehicle 301, as shown in 1110, the electronic device 101 may allow the audio output through the vehicle 301 based on the relationship information on the passenger and the attribute of the audio of which the output has been requested. For example, if the relationship information on the passenger in the vehicle 301 corresponds to one of the first protection level to the fourth protection level, and the attribute of the audio of which the output has been requested corresponds to the second audio attribute (e.g., music reproduction (CONTENT_TYPE_MUSIC, USAGE MEDIA), direction guidance (CONTENT_TYPE_MUSIC, USAGE_ASSISTANCE_NAVIGATION_GUIDANCE), the electronic device 101 may allow the audio output through the vehicle 301. If music is reproduced together with the first user interface 1120 while the user and the passengers have taken the vehicle 301, the electronic device 101 may control the audio to be output through the audio output unit of the vehicle 301. If the attribute of the audio of which the output has been requested corresponds to the second audio attribute, the electronic device 101 may allow the audio output through the vehicle regardless of the relationship information on the passenger.

FIG. 11B is a diagram illustrating controlling the audio output through a user device excluding the vehicle, according to an embodiment.

Referring to FIG. 11B, if a user 1170 has taken the vehicle 301, the electronic device 110 may determine existence/nonexistence of a passenger in the vehicle 301, and if the passenger is present in the vehicle 301, as shown in 1130, the electronic device 101 may disallow the audio output through the vehicle 301 based on the relationship information on the passenger and the attribute of the audio of which the output has been requested, and may control the audio output through the user device. For example, if the relationship information on the passenger in the vehicle 301 corresponds to one of the second protection level to the fourth protection level, and the attribute of the audio of which the output has been requested corresponds to the first audio attribute, the electronic device 101 may determine whether the configured word is included in the text corresponding to the audio of which the output has been requested. If the configured word (e.g., "darling") is included in the message received together with the second user interface 1150 while the user and the passengers have taken the vehicle 301, the electronic device 101 may disallow the audio output through the vehicle 301. If the audio output through the vehicle 301 is disallowed, the electronic device 101 may search for whether a user device 1170 associated with the user is connected, and may output the audio of which the output has been requested through the user device 1170. The user device 1170 may be a wireless audio output device wearable on the user's ears. The electronic device may control the voice corresponding to the message sender or the message contents to be provided through the user device 170 through the TTS function.

A method for operating an electronic device (e.g., electronic device 101 of FIG. 1) according to various embodiments of the disclosure may include: detecting whether a user has taken a vehicle (e.g., vehicle 301 of FIG. 3) based on detection of the vehicle through a communication module (e.g., communication module 190 of FIG. 1) of the electronic device; determining existence/nonexistence of a passenger in the vehicle based on at least one of an external electronic device (e.g., electronic device 102 or electronic device 104 of FIG. 1) searched for through the communication module, a sound collected by at least one microphone (e.g., input module 150 of FIG. 1) of the electronic device, or an image obtained from at least one camera module (e.g., camera module 180 of FIG. 1) of the electronic device; giving a protection level based on the relationship information on the passenger; giving a weight value based on an attribute of an audio of which an output has been requested; and controlling an audio output through the vehicle based on the protection level in accordance with the relationship information and the weight value in accordance with the attribute of the audio.

Determining existence/nonexistence of the passenger in the vehicle may include at least one of determining that the passenger is present in the vehicle in case that an advertisement packet is transmitted through a scanning process, and a response signal to the advertisement packet is received from the external electronic device; determining that the passenger is present in the vehicle in case that ambient sound is collected through the at least one microphone of the electronic device, and a non-user voice is detected through analysis of the collected sound; and determining that the passenger is present in the vehicle in case that the image is obtained from the at least one camera, and a non-user face is detected through analysis of the image.

Determining a protection level may include determining whether the passenger is a registered user from at least one of the external electronic device possessed by the passenger, the passenger's voice, or the passenger's image; identifying a group to which the passenger belongs or the number of contacts corresponding to the passenger in case that the passenger is a registered user; and determining a protection level for the passenger based on the group to which the passenger belongs or the number of contacts corresponding to the passenger.

Determining the protection level may include giving a fourth protection level for the passenger in case that the passenger is not the registered passenger; giving a third protection level for the passenger in case that the group to which the passenger belongs is not a predetermined group; giving a second protection level for the passenger in case that the number of contacts corresponding to the passenger is less than or equal to a predetermined number; and giving a first protection level for the passenger in case that the group to which the passenger belongs is the predetermined group, and the number of contacts corresponding to the passenger exceeds the predetermined number.

Analyzing the collected sound may include determining whether the attribute of the audio of which the output has been requested is a predetermined audio attribute; determining whether a configured word is included in a text corresponding to the audio in case that the attribute of the audio of which the output has been requested is the predetermined audio attribute; and giving a weight value for the audio of which the output has been requested based on whether the configured word is included in the text corresponding to the audio. Giving the weight value may include giving a third weight value for the audio of which the output has been requested in case that the attribute of the audio of which the output has been requested is not the predetermined audio attribute; giving a second weight value for the audio of which the output has been requested in case that the attribute of the audio of which the output has been requested is the predetermined audio attribute, and the configured word is not included in the text corresponding to the audio; and giving a first weight value for the audio of which the output has been requested in case that the attribute of the audio of which the output has been requested is the predetermined audio attribute, and the configured word is included in the text corresponding to the audio.

Controlling the audio output may include allowing an audio output through the vehicle regardless of the relationship information of the passenger in case that the third weight value is given for the audio of which the output has been requested; allowing an audio output through the vehicle in case that the first weight value is given for the audio of which the output has been requested, and a protection level in accordance with the relationship information of the passenger is a predetermined protection level; and disallowing the audio output through the vehicle in case that the first weight value is given for the audio of which the output has been requested, wherein the protection level in accordance with the relationship information of the passenger is not the predetermined protection level.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:
1. An electronic device comprising:
at least one camera module;
at least one microphone;
a communication module;
memory storing instructions; and
a processor,
wherein the instructions, when executed individually or collectively by the processor, cause the electronic device to:
detect whether a user has taken a vehicle based on detection of the vehicle through the communication module,
determine an existence or nonexistence of a passenger in the vehicle based on at least one of an external electronic device searched for through the communication module, a sound collected by the at least one microphone, or an image obtained from the at least one camera module,
determine whether the passenger is a registered user from at least one of the external electronic device possessed by the passenger, the passenger's voice, or the passenger's image,
when the passenger is the registered user, identify a group to which the passenger belongs or a number of contacts with the passenger,
determine a protection level for the passenger based on the group to which the passenger belongs or the number of contacts with the passenger,
determine whether an attribute of audio of which an output has been requested is a pre-set audio attribute,
when the attribute of the audio of which the output has been requested is not the pre-set audio attribute, give a third weight value for the audio of which the output has been requested,
when the third weight value is given for the audio of which the output has been requested, allow an audio output through the vehicle regardless of relationship information of the passenger and control the audio of which the output has been requested to be output through the vehicle, when the attribute of the audio of which the output has been requested is the pre-set audio attribute, determine whether a pre-set word is included in a text corresponding to the audio, when the attribute of the audio of which the output has been requested is the pre-set audio attribute, and the pre-set word is not included in the text corresponding to the audio, give a second weight value for the audio of which the output has been requested, when the attribute of the audio of which the output has been requested is the pre-set audio attribute, and the pre-set word is included in the text corresponding to the audio, give a first weight value for the audio of which the output has been requested, when the first weight value is given for the audio of which the output has been requested, and the determined protection level for the passenger is a pre-set protection level, allow an audio output through the vehicle, and control the audio of which the output has been requested to be output through the vehicle, when the first weight value is given for the audio of which the output has been requested, and the determined protection level for the passenger is not the pre-set protection level, disallow the audio output through the vehicle, when the audio output through the vehicle is disallowed, determine whether a user device is connected to the electronic device, and when the user device is connected to the electronic device, control the audio of which the output has been requested to be output through the user device.

2. The electronic device of claim 1, wherein the instructions, when executed individually or collectively by the processor, cause the electronic device to determine that the user has taken the vehicle in case that a connection with the vehicle is attempted through a scanning process or the connection with the vehicle is made based on a configured communication method.

3. The electronic device of claim 1, wherein the instructions, when executed individually or collectively by the processor, cause the electronic device to:
transmit an advertisement packet through a scanning process, and determine that the passenger is present in the vehicle in case that a response signal to the advertisement packet is received from the external electronic device.

4. The electronic device of claim 1, wherein the instructions, when executed individually or collectively by the processor, cause the electronic device to:
collect ambient sound through the at least one microphone, and
determine that the passenger is present in the vehicle in case that a non-user voice is detected through analysis of the collected ambient sound.

5. The electronic device of claim 1, wherein the instructions, when executed individually or collectively by the processor, cause the electronic device to:
obtain an image from the at least one camera, and
determine that the passenger is present in the vehicle in case that a non-user face is detected through analysis of the image.

6. The electronic device of claim 1, wherein the instructions, when executed individually or collectively by the processor, cause the electronic device to:
give a fourth protection level for the passenger when the passenger is not the registered passenger,
give a third protection level for the passenger when the group to which the passenger belongs is not a predetermined group,
give a second protection level for the passenger when the number of contacts with the passenger is less than or equal to a predetermined number, and
give a first protection level for the passenger when the group to which the passenger belongs is the predetermined group, and the number of contacts with the passenger exceeds the predetermined number.

7. A method for operating an electronic device comprising:
detecting whether a user has taken a vehicle based on detection of the vehicle through a communication module of the electronic device;
determining an existence or nonexistence of a passenger in the vehicle based on at least one of an external electronic device searched for through the communication module, a sound collected by at least one microphone of the electronic device, or an image obtained from at least one camera module of the electronic device;
determining whether the passenger is a registered user from at least one of the external electronic device possessed by the passenger, the passenger's voice, or the passenger's image;
when the passenger is the registered user, identifying a group to which the passenger belongs or a number of contacts with the passenger;
determining a protection level for the passenger based on the group to which the passenger belongs or the number of contacts with the passenger;
determine whether an attribute of audio of which an output has been requested is a pre-set audio attribute;
when the attribute of the audio of which the output has been requested is not the pre-set audio attribute, giving a third weight value for the audio of which the output has been requested,
when the third weight value is given for the audio of which the output has been requested, allowing an audio output through the vehicle regardless of relationship information of the passenger and controlling the audio of which the output has been requested to be output through the vehicle,
when the attribute of the audio of which the output has been requested is the pre-set audio attribute, determining whether a pre-set word is included in a text corresponding to the audio,
when the attribute of the audio of which the output has been requested is the pre-set audio attribute, and the pre-set word is not included in the text corresponding to the audio, giving a second weight value for the audio of which the output has been requested,
when the attribute of the audio of which the output has been requested is the pre-set audio attribute, and the pre-set word is included in the text corresponding to the audio, giving a first weight value for the audio of which the output has been requested,
when the first weight value is given for the audio of which the output has been requested, and the determined protection level for the passenger is a pre-set protection level, allowing an audio output through the vehicle, and controlling the audio of which the output has been requested to be output through the vehicle,
when the first weight value is given for the audio of which the output has been requested, and the determined protection level for the passenger is not the pre-set protection level, disallowing the audio output through the vehicle, when the audio output through the vehicle is disallowed, determining whether a user device is connected to the electronic device, and when the user device is connected to the electronic device, controlling the audio of which the output has been requested to be output through the user device.

8. The method of claim 7, wherein determining the existence or nonexistence of the passenger in the vehicle further comprises at least one of:

determining that the passenger is present in the vehicle in case that an advertisement packet is transmitted through a scanning process, and a response signal to the advertisement packet is received from the external electronic device;

determining that the passenger is present in the vehicle in case that ambient sound is collected through the at least one microphone of the electronic device, and a non-user voice is detected through analysis of the collected ambient sound; and determining that the passenger is present in the vehicle in case that the image is obtained from the at least one camera, and a non-user face is detected through analysis of the image.

9. The method of claim 7, wherein giving the protection level further comprises at least one of:

giving a fourth protection level for the passenger in case that the passenger is not the registered user;

giving a third protection level for the passenger in case that the group to which the passenger belongs is not a predetermined group;

giving a second protection level for the passenger in case that the number of contacts corresponding to the passenger is less than or equal to a predetermined number; and giving a first protection level for the passenger in case that the group to which the passenger belongs is the predetermined group, and the number of contacts corresponding to the passenger exceeds the predetermined number.

* * * * *